US011051185B2

(12) United States Patent
Määttanen et al.

(10) Patent No.: US 11,051,185 B2
(45) Date of Patent: Jun. 29, 2021

(54) CONFIGURATION FOR FLIGHT STATUS INDICATION OF AN AERIAL UE

(71) Applicant: Telefonaktiebolaget LM Ericsson (publ), Stockholm (SE)

(72) Inventors: Helka-Liina Määttanen, Helsinki (FI); Xingqin Lin, Santa Clara, CA (US); Siva Muruganathan, Stittsville (CA); Henrik Rydén, Solna (SE); Vijaya Yajnanarayana, Bangalore (IN); Zhenhua Zou, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 168 days.

(21) Appl. No.: 16/318,518

(22) PCT Filed: Nov. 14, 2018

(86) PCT No.: PCT/SE2018/051163
§ 371 (c)(1),
(2) Date: Jan. 17, 2019

(87) PCT Pub. No.: WO2019/098916
PCT Pub. Date: May 23, 2019

(65) Prior Publication Data
US 2020/0359234 A1 Nov. 12, 2020

Related U.S. Application Data

(60) Provisional application No. 62/587,122, filed on Nov. 16, 2017.

(51) Int. Cl.
*H04W 4/02* (2018.01)
*H04W 24/02* (2009.01)
(Continued)

(52) U.S. Cl.
CPC .......... *H04W 24/02* (2013.01); *G08G 5/0013* (2013.01); *G08G 5/0069* (2013.01); *H04B 7/18506* (2013.01); *H04W 64/006* (2013.01)

(58) Field of Classification Search
CPC . H04W 72/1284; H04W 4/029; H04W 40/02; H04W 4/80; G08G 5/0086
(Continued)

(56) References Cited

U.S. PATENT DOCUMENTS 3,810,096 A * 5/1974 Kabat .................... H04B 3/542
340/534
5,828,585 A * 10/1998 Welk ..................... G01C 21/28
702/96

(Continued)

FOREIGN PATENT DOCUMENTS

WO    WO2019098916 A1 * 5/2019

OTHER PUBLICATIONS

"Marine/aviation: Omega: Global navigating by VLF fix", Kasper, Jr., et al, IEEE Spectrum May 1979 (Year: 1979).*
(Continued)

*Primary Examiner* — William D Cumming
(74) *Attorney, Agent, or Firm* — Coats & Bennett, PLLC

(57) ABSTRACT

A base station (300a) transmits, to a wireless device (100), a criteria for determining that the wireless device (100) has a status. The criteria comprises a height threshold. The wireless device (100) receives the criteria for determining that the wireless device (100) has the status from the base station (300a). The wireless device (100) transmits an indication of the status of the wireless device (100) to the base station (300a). The base station (300a) receives the indication of the status of the wireless device (100).

22 Claims, 15 Drawing Sheets

(51) Int. Cl.
*G08G 5/00* (2006.01)
*H04B 7/185* (2006.01)
*H04W 64/00* (2009.01)

(58) Field of Classification Search
USPC .......................... 340/534; 455/62.11, 67.11
See application file for complete search history.

(56) References Cited

U.S. PATENT DOCUMENTS

| | | | | |
|---|---|---|---|---|
| 6,424,914 | B1* | 7/2002 | Lin | G01C 21/165 |
| | | | | 342/357.29 |
| 6,859,729 | B2* | 2/2005 | Breakfield | G01C 21/165 |
| | | | | 342/357.31 |
| 8,050,630 | B1* | 11/2011 | Arbuckle | G01S 19/23 |
| | | | | 455/67.11 |
| 8,299,966 | B2* | 10/2012 | Smith | G01S 5/10 |
| | | | | 342/464 |
| 8,355,866 | B2* | 1/2013 | Smith | G01S 1/24 |
| | | | | 701/468 |
| 9,992,623 | B2* | 6/2018 | Skaaksrud | H04W 76/15 |
| 10,057,722 | B2* | 8/2018 | Skaaksrud | H04W 28/0252 |
| 10,387,727 | B2* | 8/2019 | Abeywardena | G05D 1/106 |
| 10,440,605 | B2* | 10/2019 | Wang | H04W 72/1284 |
| 2004/0078137 | A1* | 4/2004 | Breakfield | G05D 1/027 |
| | | | | 701/2 |
| 2012/0029818 | A1* | 2/2012 | Smith | G01S 1/24 |
| | | | | 701/468 |
| 2017/0255206 | A1* | 9/2017 | Chen | G01S 19/48 |
| 2017/0278061 | A1* | 9/2017 | Skaaksrud | G06Q 10/083 |
| 2017/0278374 | A1* | 9/2017 | Skaaksrud | H04W 4/029 |
| 2017/0279892 | A1* | 9/2017 | Skaaksrud | H04W 4/029 |
| 2017/0280289 | A1* | 9/2017 | Skaaksrud | H04W 4/02 |
| 2017/0280297 | A1* | 9/2017 | Skaaksrud | G08B 25/08 |
| 2017/0280347 | A1* | 9/2017 | Skaaksrud | G06Q 10/083 |
| 2017/0280350 | A1* | 9/2017 | Skaaksrud | H04W 4/029 |
| 2017/0280351 | A1* | 9/2017 | Skaaksrud | H04W 36/30 |
| 2018/0275654 | A1* | 9/2018 | Merz | G08G 5/0086 |
| 2019/0080142 | A1* | 3/2019 | Abeywardena | B64D 47/08 |
| 2020/0359234 | A1* | 11/2020 | Maattanen | G08G 5/0069 |

OTHER PUBLICATIONS

Ran Chairman (Intel), "Chairman notes", 3GPP TSG-RAN WG2 Meeting #99bis, Prague, Czech Republic, Oct. 9, 2017, pp. 1-131, 3GPP.

Qualcomm, "Identification and certification of Aerial Vehicles", 3GPP TSG-RAN WG2 Meeting #99, Berlin, Germany, Aug. 21, 2017, pp. 1-6, R2-1708238, 3GPP.

NTT Docomo Inc, et al., "New SID on Enhanced Support for Aerial Vehicles", 3GPP TSG RAN Meeting #75, Dubrovnik, Croatia, Mar. 6, 2017, pp. 1-4, RP-170779, 3GPP.

Määttänen et al., "System-level performance of LTE-Advanced with joint transmission and dynamic point selection schemes", EURASIP Journal on Advances in Signal Processing 2012, Jan. 1, 2012, pp. 1-18, Springer, US.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 14)", Technical Specification, 3GPP TS 36.331 V14.3.0, Jun. 1, 2017, pp. 1-745, 3GPP, France.

National Aeronautics and Space Administration, "Unmanned Aircraft System (UAS) Traffic Management (UTM)", online article, pp. 1-2, obtained on Sep. 25, 2018, obtained from internet: https://utm.arc.nasa.gov/index.shtml.

Lenovo, et al., "Discussion for status management for aerial UE", 3GPP TSG-RAN WG2 Meeting#99bis, Prague, Czech, Oct. 9, 2017, pp. 1-3, R2-1711379, 3GPP.

Lenovo et al., "Consideration for potential mobility enhancement for aerial UE", 3GPP TSG-RAN WG2 Meeting #99bis, Prague, Czech, Oct. 9, 2017, pp. 1-6, R2-1711377, 3GPP.

Sequans Communications, "Interference Detection of Aerial Vehicles", 3GPP TSG-RAN WG1 #90-Bis, Prague, CZ, Oct. 9, 2017, pp. 1-3, R1-1718298, 3GPP.

* cited by examiner

*LocationInfo* information element

```
-- ASN1START

LocationInfo-r10 ::=    SEQUENCE {
    locationCoordinates-r10     CHOICE {
        ellipsoid-Point-r10                             OCTET STRING,
        ellipsoidPointWithAltitude-r10                  OCTET STRING,
        ...,
        ellipsoidPointWithUncertaintyCircle-r11         OCTET STRING,
        ellipsoidPointWithUncertaintyEllipse-r11        OCTET STRING,
        ellipsoidPointWithAltitudeAndUncertaintyEllipsoid-r11   OCTET STRING,
        ellipsoidArc-r11                                OCTET STRING,
        polygon-r11                                     OCTET STRING
    },
    horizontalVelocity-r10                              OCTET STRING    OPTIONAL,
    gnss-TOD-msec-r10                                   OCTET STRING    OPTIONAL,
    ...
}

-- ASN1STOP
```

FIG. 2

RECEIVING AN INDICATION OF THE STATUS OF THE WIRELESS DEVICE, THE STATUS BEING ONE OF A PLURALITY OF PREDEFINED STATUSES THAT THE BASE STATION IS CONFIGURED TO RECOGNIZE, THE PREDEFINED STATUSES COMPRISING A PLURALITY OF DISTINCT AERIAL STATUSES, EACH OF WHICH INDICATES THAT THE WIRELESS DEVICE IS AIRBORNE
1200

CONFIGURING THE WIRELESS DEVICE BASED ON THE STATUS
1210

*FIG. 5*

RECEIVING, FROM A BASE STATION, A CRITERIA FOR DETERMINING THAT THE WIRELESS DEVICE HAS A STATUS, WHEREIN THE CRITERIA COMPRISES A HEIGHT THRESHOLD
1300

TRANSMITTING AN INDICATION OF THE STATUS OF THE WIRELESS DEVICE TO THE BASE STATION
1310

*FIG. 6*

TRANSMITTING, TO THE WIRELESS DEVICE, A CRITERIA FOR DETERMINING THAT THE WIRELESS DEVICE HAS THE STATUS, WHEREIN THE CRITERIA COMPRISES A HEIGHT THRESHOLD
1400

RECEIVING AN INDICATION OF THE STATUS OF THE WIRELESS DEVICE
1410

*FIG. 7*

CONFIGURATION FOR FLIGHT STATUS INDICATION OF AN AERIAL UE

RELATED APPLICATIONS

This application claims priority to U.S. Provisional Patent Application Ser. No. 62/587,122, filed Nov. 16, 2017, the entire contents of which are incorporated by reference herein.

TECHNICAL FIELD

The present disclosure relates generally to a wireless communication system, and more specifically relates to status reporting in a wireless communication system for a wireless device that is airborne.

BACKGROUND

Wireless communication is becoming desired in an increasingly broad number of environments. Most wireless communication systems are deployed with terrestrial coverage in mind. This may, however, make certain wireless communication systems less optimal in certain respects when a wireless device (e.g., a user equipment (UE)) is airborne.

SUMMARY

Embodiments of the present disclosure are generally directed to enabling a wireless communication system to accommodate a wireless device that is airborne. For example, particular embodiments enable the network to obtain the flight status of an aerial UE.

One or more embodiments of the present disclosure include a method of reporting status implemented in a wireless device. The method comprises receiving, from a base station, a criteria for determining that the wireless device has a status, wherein the criteria comprises a height threshold, and transmitting an indication of the status of the wireless device to the base station. In some such embodiments, the method further comprises selecting the status from a plurality of predefined statuses. The predefined statuses comprise a plurality of distinct aerial statuses, each of which indicates that the wireless device is airborne. In some such embodiments, the plurality of distinct aerial statuses comprises at least two aerial mobility statuses that further indicate respective levels of mobility while the wireless device is airborne.

In some embodiments, the plurality of distinct aerial statuses comprises a hovering status. In some embodiments, the plurality of distinct aerial statuses comprises a high speed flight status. In some embodiments, the plurality of distinct aerial statuses comprises a cruising flight status. In some embodiments, the plurality of distinct aerial statuses comprises a flight following a path status. In some such embodiments, the method further comprises, responsive to the status being the flight following the path status, transmitting the path to the base station.

In some embodiments, the plurality of distinct aerial statuses comprises a high altitude flight status. In some embodiments, the plurality of distinct aerial statuses comprises a takeoff/landing status. In some embodiments, the plurality of distinct aerial statuses comprises a remote controlled flight status. In some embodiments, the plurality of distinct aerial statuses comprises one or more vertical velocity change statuses. In some embodiments, the predefined statuses further comprise a plurality of warning statuses. In some embodiments, the predefined statuses further comprise an error status. In some embodiments, the predefined statuses further comprise a loss of Global Positioning System (GPS) signal status. In some such embodiments, the method further comprises, responsive to the status being the loss of GPS signal status, using received position reference signals to navigate.

In some embodiments, the predefined statuses further comprise a loss of remote controller signal status. In some embodiments, the predefined statuses further comprise a low battery warning status. In some such embodiments, the method further comprises, responsive to the status being the low battery warning status and transmitting the indication, surrendering navigational control to a remote controller.

In some embodiments, transmitting the indication comprises transmitting the indication in a two-bit field having four distinct states, each of the states corresponding to a respective one of the predefined statuses.

In some embodiments, the plurality of predefined statuses further comprise at least one non-aerial status that indicates that the wireless device is not airborne.

In some embodiments, transmitting the indication comprises transmitting the indication via Radio Resource Control signalling while the wireless device is in an RRC_CONNECTED state.

In some embodiments, the method further comprises, receiving a request, from the base station, requesting the wireless device to trigger the transmitting in response to transitioning to the status.

In some embodiments, the transmitting is responsive to expiration of a periodic reporting timer.

In some embodiments, the transmitting is responsive to a status report request from the base station.

In some embodiments, the criteria further comprises a speed threshold.

In some embodiments, the method further comprises responsive to transmitting the indication, receiving notification from the base station to use a power control parameter.

In some embodiments, the method further comprises, responsive to transmitting the indication, receiving notification from the base station to use a radio resource allocation parameter.

In some embodiments, the method further comprises responsive to transmitting the indication, receiving notification to restrict handovers.

In some embodiments, transmitting the indication comprises transmitting the indication apart from radio resource management measurement report signaling.

Other embodiments include a wireless device for reporting status. The wireless device is configured to receive, from a base station, a criteria for determining that the wireless device has a status. The criteria comprises a height threshold. The wireless device is further configured to transmit an indication of the status of the wireless device to the base station.

In some embodiments, the wireless device is configured to perform any of the methods described above.

In some embodiments, the wireless device comprises a processor and a memory, the memory containing instructions executable by the processor whereby the device is configured as discussed above.

In some embodiments, the wireless device comprises a receiving module configured to receive the criteria for determining that the wireless device has the status, and further comprises a transmitting module configured to transmit the indication of the status.

Other embodiments include a method of obtaining a status of a wireless device implemented by a base station. The method comprises transmitting, to the wireless device, a criteria for determining that the wireless device has the status. The criteria comprises a height threshold. The method further comprises receiving an indication of the status of the wireless device. In some embodiments, the method further comprises configuring the wireless device based on the status.

In some embodiments, the status is one of a plurality of predefined statuses that the base station is configured to recognize. The predefined statuses comprise a plurality of distinct aerial statuses, each of which indicates that the wireless device is airborne. In some embodiments, the plurality of distinct aerial statuses comprises at least two aerial mobility statuses that further indicate respective levels of mobility while the wireless device is airborne. In some embodiments, the plurality of distinct aerial statuses comprises a hovering status. In some embodiments, the plurality of distinct aerial statuses comprises a high speed flight status. In some embodiments, the plurality of distinct aerial statuses comprises a cruising flight status. In some embodiments, the plurality of distinct aerial statuses comprises a flight following a path status. In some embodiments, the plurality of distinct aerial statuses comprises a high altitude flight status. In some embodiments, the plurality of distinct aerial statuses comprises a takeoff/landing status. In some embodiments, the plurality of distinct aerial statuses comprises a remote controlled flight status. In some embodiments, the plurality of distinct aerial statuses comprises one or more vertical velocity change statuses. In some embodiments, the predefined statuses further comprise a plurality of warning statuses. In some embodiments, the predefined statuses further comprise an error status. In some embodiments, the predefined statuses further comprise a loss of Global Positioning System (GPS) signal status. In some such embodiments, the method further comprises responsive to the status being the loss of GPS signal status, configuring position reference signals for the wireless device to use for navigation.

In some embodiments, the predefined statuses further comprise a loss of remote controller signal status. In some such embodiments, the method further comprises responsive to the status being the loss of remote controller signal status, notifying an Unmanned Aerial Vehicle (UAV) Traffic Management (UTM) system of the status.

In some embodiments, the predefined statuses further comprise a low battery warning status. In some such embodiments, the method further comprises, responsive to the status being the low battery warning status, notifying a UTM system of the status.

In some embodiments, receiving the indication comprises receiving the indication via Radio Resource Control signalling while the wireless device is in an RRC_CONNECTED state.

In some embodiments, the method further comprises transmitting a request, to the wireless device, requesting that the wireless device transmit the indication in response to the wireless device transitioning to the status.

In some embodiments, the method further comprises configuring the wireless device to transmit the indication responsive to expiration of a periodic reporting timer.

In some embodiments, the method further comprises transmitting a status report request to the wireless device and receiving the indication in response.

In some embodiments, the method further comprises receiving, from the wireless device, a flight path that the wireless device is following.

In some embodiments, the method further comprises using the flight path that the wireless device is following to determine another base station along the flight path and preparing to handover the wireless device to the other base station.

In some embodiments, the method further comprises selecting an interference mitigation scheme for the wireless device based on the status.

In some embodiments, the method further comprises selecting a mobility solution based on the status.

In some embodiments, the method further comprises transmitting notification, to the wireless device, notifying the wireless device to use a power control parameter selected based on the status.

In some embodiments, the method further comprises transmitting notification, to the wireless device, notifying the wireless device to use a radio resource allocation parameter selected based on the status.

In some embodiments, the method further comprises responsive to receiving the indication, transmitting notification, to the wireless device, notifying the wireless device to restrict handovers.

In some embodiments, receiving the indication comprises receiving the indication in a two-bit field having four distinct states, each of the states corresponding to a respective one of the predefined statuses.

In some embodiments, the criteria further comprises a speed threshold.

In some embodiments, receiving the indication comprises receiving the indication apart from radio resource management measurement report signaling.

In some embodiments, the plurality of predefined statuses further comprise at least one non-aerial status that indicates that the wireless device is not airborne.

Other embodiments include a base station for obtaining a status of a wireless device. The base station is configured to transmit, to the wireless device, a criteria for determining that the wireless device has the status. The criteria comprises a height threshold. The base station is further configured to receive an indication of the status of the wireless device.

In some embodiments, the base station is further configured to perform any of the base station methods discussed above.

In some embodiments, the base station comprises a processor and a memory, the memory containing instructions executable by the processor whereby the device is configured as discussed above.

In some embodiments, the base station comprises a receiving module configured to receive the criteria for determining that the wireless device has the status, and a transmitting module configured to transmit the indication of the status.

Other embodiments include a computer program, comprising instructions which, when executed on at least one processor of a device, cause the at least one processor to carry out any of the methods described above.

Other embodiments include a carrier containing the computer program, wherein the carrier is one of an electronic signal, optical signal, radio signal, or computer readable storage medium.

Any of the embodiments described above may further comprise one or more features described below.

BRIEF DESCRIPTION OF THE DRAWINGS

Aspects of the present disclosure are illustrated by way of example and are not limited by the accompanying figures. In general, the use of a reference numeral should be regarded as referring to the depicted subject matter according to one or more embodiments, whereas discussion of a specific instance of an illustrated element will append a letter designation thereto (e.g., discussion of a base station 300, generally, as opposed to discussion of particular instances of base stations 300*a*, 300*b*).

FIG. 2 is a an Abstract Syntax Notation One (ASN.1) fragment describing an example information element, according to one or more embodiments of the present disclosure.

FIG. 5 is a flow diagram, illustrating an example method implemented in a base station, according to one or more embodiments of the present disclosure.

FIG. 6 is a flow diagram, illustrating an example method implemented in a wireless device, according to one or more embodiments of the present disclosure.

FIG. 7 is a flow diagram, illustrating an example method implemented in a base station, according to one or more embodiments of the present disclosure.

DETAILED DESCRIPTION

Figure 1:
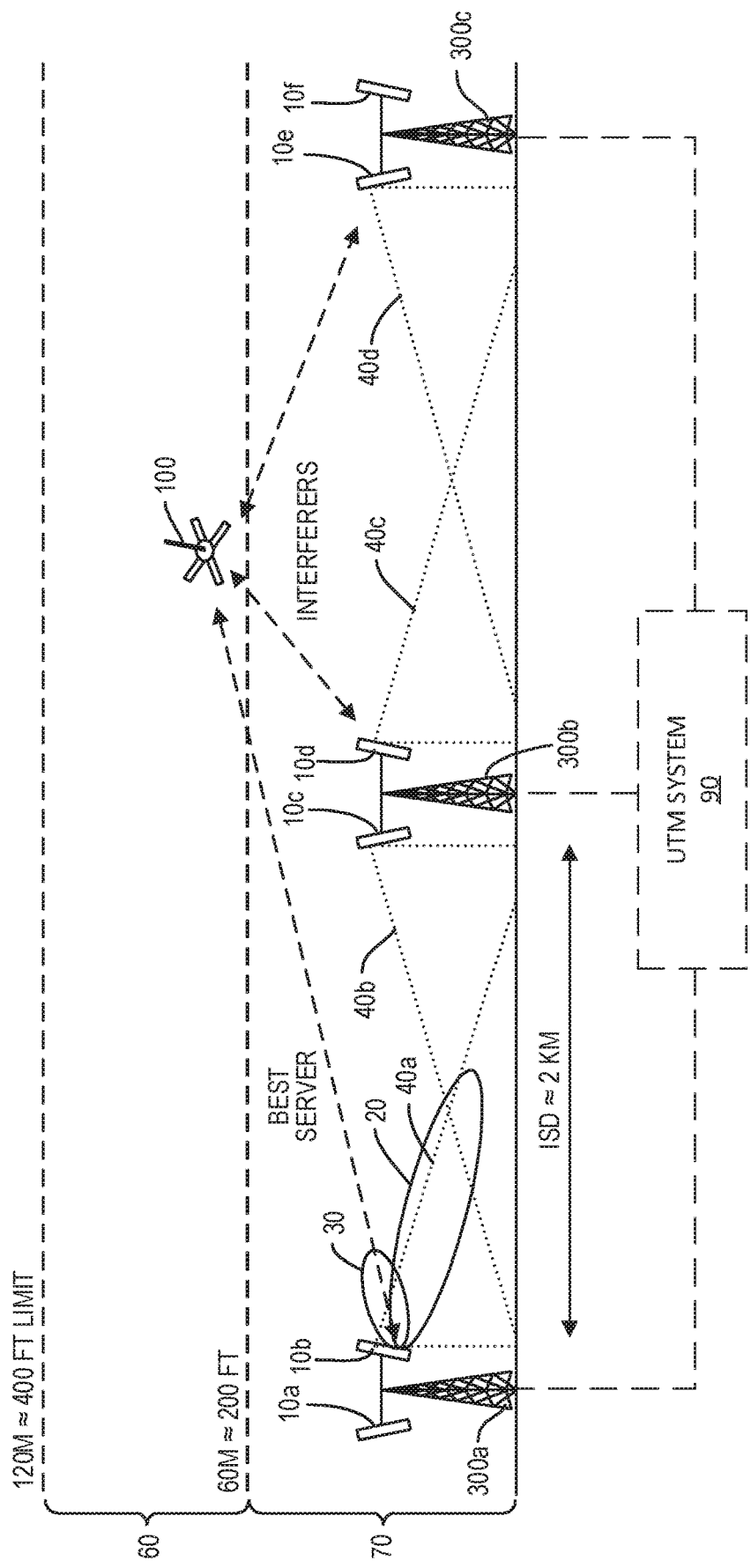
FIG. 1 is a schematic diagram illustrating an example wireless device that is airborne and above boresight of a plurality of base stations, according to one or more embodiments of the present disclosure.

Although the present disclosure is described within the context of Long Term Evolution (LTE), i.e., Enhanced-Universal Mobile Telecommunications System (UMTS) Terrestrial Radio Access (E-UTRA) Network (E-UTRAN). It should be understood that the problems and solutions described herein may be equally applied to wireless access networks and UEs implementing other access technologies and standards. LTE is used as an example technology where the subject matter disclosed herein is suitable. Accordingly, describing embodiments in the context of LTE, as an example, is useful for understanding the technical ideas, problems, and/or solutions discussed herein, Throughout this disclosure, the terms Unmanned Aerial Vehicle (UAV), aerial vehicle, aerial UE, and drone are used interchangeably. Generally speaking, each of these terms refers to a wireless device that may be airborne in a wireless communication system.

Serving aerial vehicles using LTE network deployments with base station antennas targeting terrestrial coverage (e.g., such as those supporting Third Generation Partnership Project (3GPP) Release 14 functionality) may, in some embodiments, have certain objectives. Some objectives may relate to addressing interference issues using an LTE network, and may particularly relate to identifying potential enhancements to LTE so that LTE may be better suited to provide connectivity and positioning services to drones in certain deployment scenarios. Such objectives may include interference mitigation solutions for improving system-level performance (e.g., at the RAN1 radio layer). Such objectives may additionally or alternatively include solutions to detect whether UL signal from an airborne UE increases interference in multiple neighbor cells (e.g., at the RAN1 and/or RAN2 radio layer).

Other objectives may relate to addressing handover issues, and may particularly relate to identifying whether cell selection enhancements, handover efficiency improvements, and/or increased handover signaling robustness can be achieved (e.g., at the RAN1 and/or RAN2 radio layer).

An airborne UE may be likely to experience radio propagation characteristics that are different from those experienced by a UE on the ground. As long as an aerial vehicle is flying at low altitude (e.g., relative to the base station antenna height), the aerial vehicle may behave like a conventional UE. However, once an aerial vehicle is flying well above the base station antenna height, for example, the UL signal from the aerial vehicle may become more visible to multiple cells due to line-of-sight propagation conditions. The more-visible UL signal from an aerial vehicle may, therefore, increase interference in neighbour cells. Such increased interference may give a negative impact to one or more UEs on the ground, e.g. a smartphone, an Internet of Things (IoT) device, etc.

Accordingly, the network may need to limit the admission of aerial vehicles in the network so that the perceived throughput performance of non-aerial UEs is not deteriorated. Further, as base station antennas are typically tilted downward, a UE on the ground or below the base station height is likely to be served by the main lobe of the antennas. However, when a drone is flying above boresight, such a drone is likely served by the side lobes of the antennas. Such a situation is depicted in FIG. 1.

FIG. 1 depicts a wireless device 100 that is airborne (e.g., comprised in an airborne drone/UAV) above a plurality of base stations 300*a*, 300*b*, 300*c*. Each of the base stations 300*a*, 300*b*, 300*c* has a plurality of antennas 10*a-b*, 10*c-d*, 10*e-f*. Base stations 300*a* and 300*b* have an inter-site distance (ISD) of two kilometers. Each of the base stations 300*a-c* is thirty meters tall. Each of antennas 10*b-e* serves a respective cell 40*a-d* intended to serve terrestrial UEs. Antennas 10*a*, 10*f* also serve a cell intended to serve terrestrial UEs, but for clarity of illustration, such is not depicted in FIG. 1. Further, although FIG. 1 depicts a one-to-one ratio of cells 40 to antennas 10, one of ordinary skill understands that in other examples, any or all of the cells 40 may be supported by a plurality of antennas (e.g., in a multi-input multi-output (MIMO) arrangement). In particular, in other embodiments, the cells 40 may instead be beams projected from a beamforming antenna array of the base station 300. Accordingly, generally stated, each of the base stations 300 serves one or more coverage areas using one or more antennas 10.

As shown in FIG. 1, a drone (e.g., a UAV comprising a wireless device 100) is flying in a high velocity transit zone 60 between approximately sixty meters and one hundred and twenty meters (i.e., between approximately two hundred feet and four hundred feet) above ground. Thus, the wireless device 100 is above boresight of the antennas 10a-f of the base stations 300a-c. As a result, the main lobe 20 of antenna 10b, for example, is unlikely to serve the wireless device 100. Instead, the side lobe 30 of antenna 10b is likely the best server of the wireless device 100, with other antennas (e.g., antennas 10d, 10e) being interferers of that service. The side lobe 30 of antenna 10b of base station 300a is indicated by the small oval shape whereas the corresponding main lobe 20 is indicated by the large oval shape in FIG. 1.

Although cellular connectivity to flying drones is feasible from a technology point of view, capacity consumed by aerial UEs often displaces overall network capacity by a disproportionately large ratio. This is typically due to a high altitude UE having line-of-sight links to many eNBs (e.g., base stations 300a-c), and therefore in the uplink its signal often causes interference and performance reduction in many cells, and in the downlink it often receives interference from many cells, thereby leading to statistically worse spectral efficiency than terrestrial spectral efficiency.

In a nutshell, it is generally more costly for terrestrial mobile networks to serve aerial traffic than serve terrestrial traffic. Thus, from an economic point of view, a cellular operator may be interested in a different pricing scheme when a UE is connected to the network from a high altitude. To support such a pricing scheme, it may be beneficial for the network to be able to identify a UE at a high altitude. Furthermore, many radio control algorithms, or functions, may be configured differently for UEs high in altitude compared to UEs on the ground. Such examples include, but not limited to, power control, mobility management, radio resource allocation, etc. It may also be beneficial for the network to identify a UE at a high altitude to facilitate such optimizations.

Federal Aviation Administration (FAA) and National Aeronautics and Space Administration (NASA) are defining an Unmanned Aircraft System Traffic Management (UTM) framework. Such a system 90 may be used to manage the traffic of UAVs as an enabler to promote its wide spread use in commercial and recreational settings while at the same time minimizing/reducing the perils to commercial air traffic and other surrounding critical infrastructure. The UTM system 90 may be designed to work autonomously (i.e., with no active human air traffic controller constantly supervising and monitoring the airspace). Specification work for the architecture is ongoing, and led by NASA.

One or more embodiments may, for example, include the UE sending assistance information to the eNB to help eNB estimate the UE's status. In particular, the UE may use the information element LocationInfo (e.g., as shown in FIG. 2) to send three-dimensional positioning information along with horizontal speed information of the UE to the eNB. It should be noted that this LocationInfo information element may be included as an optional item in a radio resource management (RRM) measurement report. Hence, such a solution may rely on the same triggering mechanism as is used for triggering RRM measurement reports to obtain LocationInfo from the aerial UE.

One or more of the LocationInfo parameters/field descriptions shown above may be as defined in 3GPP TS36.355, e.g., with the first/leftmost bit of the first octet containing the most significant bit.

One or more other embodiments may additionally or alternatively use a binary parameter as an aerial UE flight status indication. For example, an aerial UE may set the state of a binary parameter "nowFlying" to TRUE if the aerial UE is flying, and the state of the binary parameter to FALSE if the aerial UE is on the ground. The flight status indication may be sent to the eNB as part of a measurement report from the aerial UE.

Notwithstanding, one problem with using the Location-Info information element as described above may be that this information element may be part of the RRM measurement report, Thus, each time a flight status changes at the aerial UE, an RRM measurement report including all information elements configured within the RRM measurement report may need to be sent to the eNB, This may result in higher RRM measurement reporting overhead. Accordingly, particular embodiments described herein decouple the aerial UE flying status report from the RRM measurement report.

Another problem with using the LocationInfo information element as described above is that there may be ambiguity in cases where a hovering aerial UE and an indoor UE in a high rise building cannot be distinguished, Similar trouble distinguishing an aerial UE from a terrestrial UE in an elevated highway may also arise when using the above-described LocationInfo information element.

Simply using a binary parameter instead may also have certain disadvantages. For example, such embodiments may involve sending limited information regarding flight status changes to the eNB. Thus, for example, embodiments using such a binary parameter may be unable to distinguish between a flying aerial UE at high speed and an aerial UE hovering at high altitude. In both of these cases, the binary parameter "nowFlying" as described above may be set to TRUE. Indeed, efficiently indicating a UE's "airborne" status (e.g. altitude, speed etc.) to a RAN may be used, e.g., for potential HO parameters adjustment and/or other wireless communication purposes.

Certain aspects of the present disclosure and their embodiments may provide solutions to these or other challenges. In particular, embodiments of the present disclosure introduce new flight statuses and describe how the network actuates based on the received flight statuses. Several options are also described regarding how to efficiently indicate to the network the flying status of an aerial UE, for example by triggering a new report when the flight status has changed. Moreover, in addition to a binary state that UE is "in-flight" or "on-ground", some embodiments include a "hovering" state where the UE remains stationary with a high altitude in the air. In addition to these, other flight statuses such as the following can also be indicated by the aerial UE to the network: high speed flight; cruise flight; flight following a path; high altitude flight; takeoff/landing; remote controlled flight; loss of GPS signal; loss of remote controller signal; low battery warning; and/or other critical errors/exceptions.

Several methods are described herein to indicate the flight-status to the network and how this flight-status is utilized in the network. Such methods include new flight statuses for "airborne" UE reporting, reporting methods of the flight statuses of "airborne" UE; and/or usage of the flight statuses at the network.

Certain embodiments may provide one or more of the following technical advantage(s). For example, useful information of the flight status may include not only whether the UE is "in flight" or "on ground" but whether the UE is in a hovering state. When a UE is hovering, the network may be able to efficiently apply different interference detection and then mitigation schemes, especially those based on network coordination where delay is involved. Thus, an advantage of certain embodiments disclosed herein may be that they allow more flight status information to be sent to the eNB than a binary 'in flight' or 'on ground' indication.

An advantage of one or more embodiments may be in allowing the aerial UE flight status indication to be decoupled from the RRM measurement reporting. Accordingly, RRM measurement reporting overhead may be reduced, e.g., when frequent flight status changes occur.

Another advantage of certain embodiments may be that reporting additional statuses (e.g., such as loss of remote controller signal, loss of GPS signal, and low battery warning) are able to be utilized by the network to enhance safety and operation of UAVs beyond visual light of sight.

Figure 3:
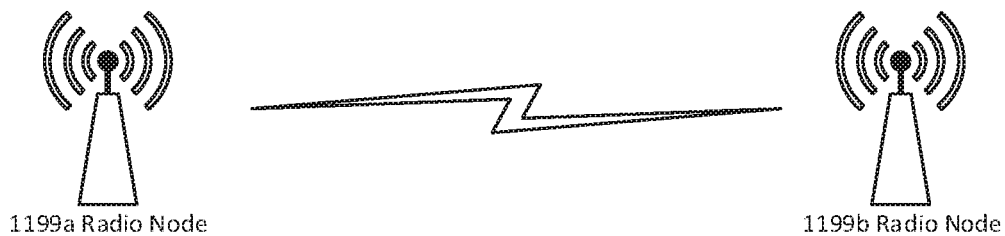
FIG. 3 is a schematic diagram illustrating an example of wireless communication between radio nodes, according to one or more embodiments of the present disclosure.

FIG. 3 illustrates an example network environment that includes two radio nodes 1199a-b. The radio nodes 1199a-b are remote from each other and wirelessly exchange signals with each other via radio communication. According to typical examples of the network environment, one of the radio nodes may be a wireless device 100 and the other may be a base station 300. Further examples of the network environment and radio nodes are discussed further below.

Figure 4:
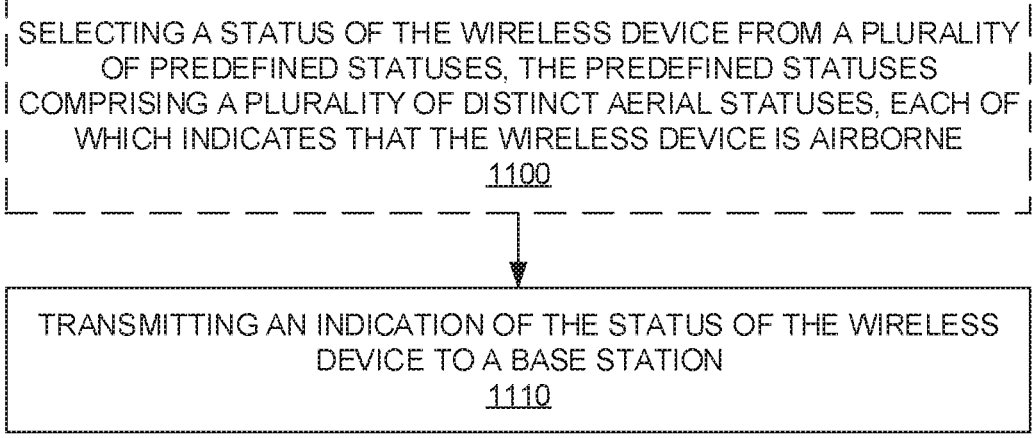
FIG. 4 is a flow diagram, illustrating an example method implemented in a wireless device, according to one or more embodiments of the present disclosure.

FIG. 4 depicts a method of reporting status in accordance with particular embodiments. The method is implemented in a wireless device 100. The method comprises transmitting an indication of a status of the wireless device 100 to a base station (block 1110). The status is selected from a plurality of predefined statuses. In particular, the predefined statuses comprise a plurality of distinct aerial statuses, each of which indicates that the wireless device 100 is airborne. In some embodiments, the method further comprises selecting the status of the wireless device 100 from the plurality of different statuses (block 1100), and transmitting the indication in response (block 1110). In some embodiments, the predefined statuses further comprise at least one non-aerial status that indicates that the wireless device 100 is not airborne.

FIG. 5 depicts a method of obtaining a status of a wireless device 100, in accordance with other particular embodiments. The method is implemented in a base station. The method comprises receiving an indication of the status of the wireless device 100 (block 1200). The status is one of a plurality of predefined statuses that the base station is configured to recognize. The predefined statuses comprise a plurality of distinct aerial statuses, each of which indicates that the wireless device 100 is airborne. In some embodiments, the method further comprises configuring the wireless device 100 based on the status (block 1210). In some embodiments, the predefined statuses further comprise at least one non-aerial status that indicates that the wireless device 100 is not airborne.

FIG. 6 depicts a method of reporting status, in accordance with other particular embodiments. The method is implemented in a wireless device 100. The method comprises receiving, from a base station, a criteria for determining that the wireless device 100 has a status, wherein the criteria comprises a height threshold (block 1300). The method further comprises transmitting an indication of the status of the wireless device 100 to the base station (block 1310).

FIG. 7 depicts a method of obtaining a status of a wireless device 100, in accordance with other particular embodiments. The method is implemented by a base station 300. The method comprises transmitting, to the wireless device 100, a criteria for determining that the wireless device 100 has the status (block 1400). The criteria comprises a height threshold. The method further comprises receiving an indication of the status of the wireless device 100 (block 1410).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
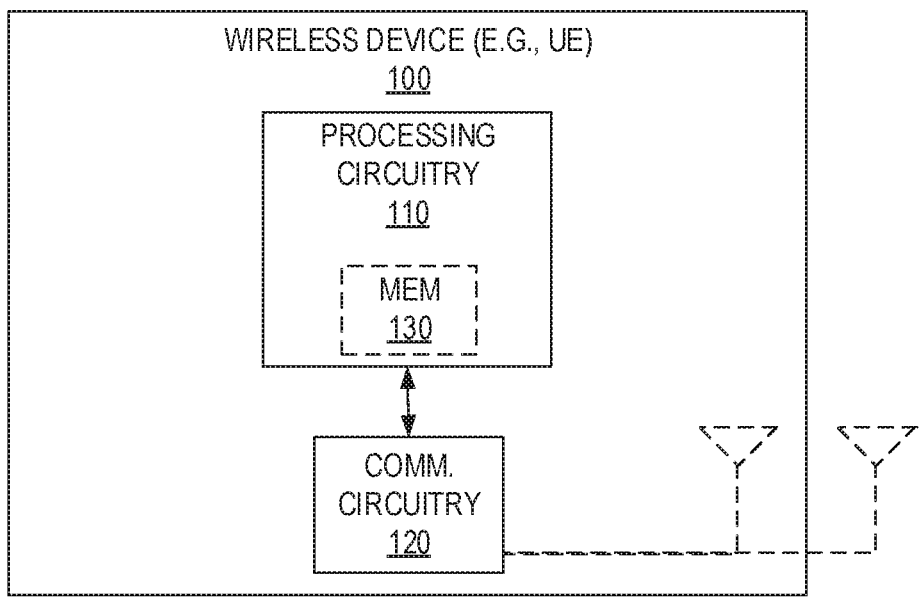
FIGS. 8-10 are schematic block diagrams illustrating example wireless devices, according to one or more embodiments of the present disclosure.

FIG. 8 for example illustrates a wireless device 100 as implemented in accordance with one or more embodiments. As shown, the wireless device 100 includes processing circuitry 110 and communication circuitry 120. The communication circuitry 120 (e.g., radio circuitry) is configured to transmit and/or receive information to and/or from one or more other nodes, e.g., via any communication technology. Such communication may occur via one or more antennas that are either internal or external to the wireless device 100. The processing circuitry 110 is configured to perform processing described above, such as by executing instructions stored in memory 130. The processing circuitry 110 in this regard may implement certain functional means, units, or modules.

Figure 9:
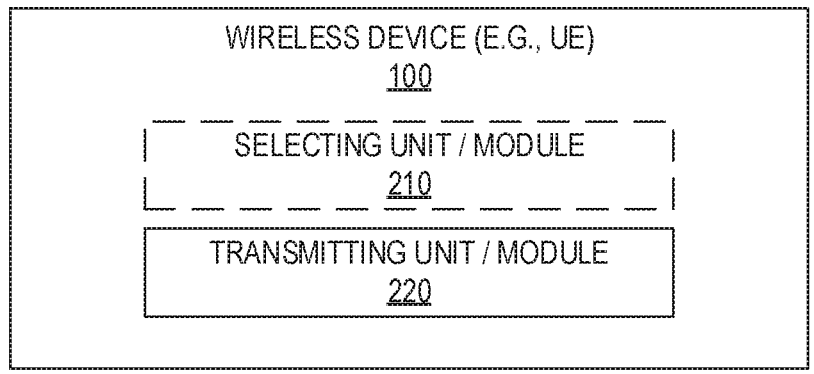
Figure 14:
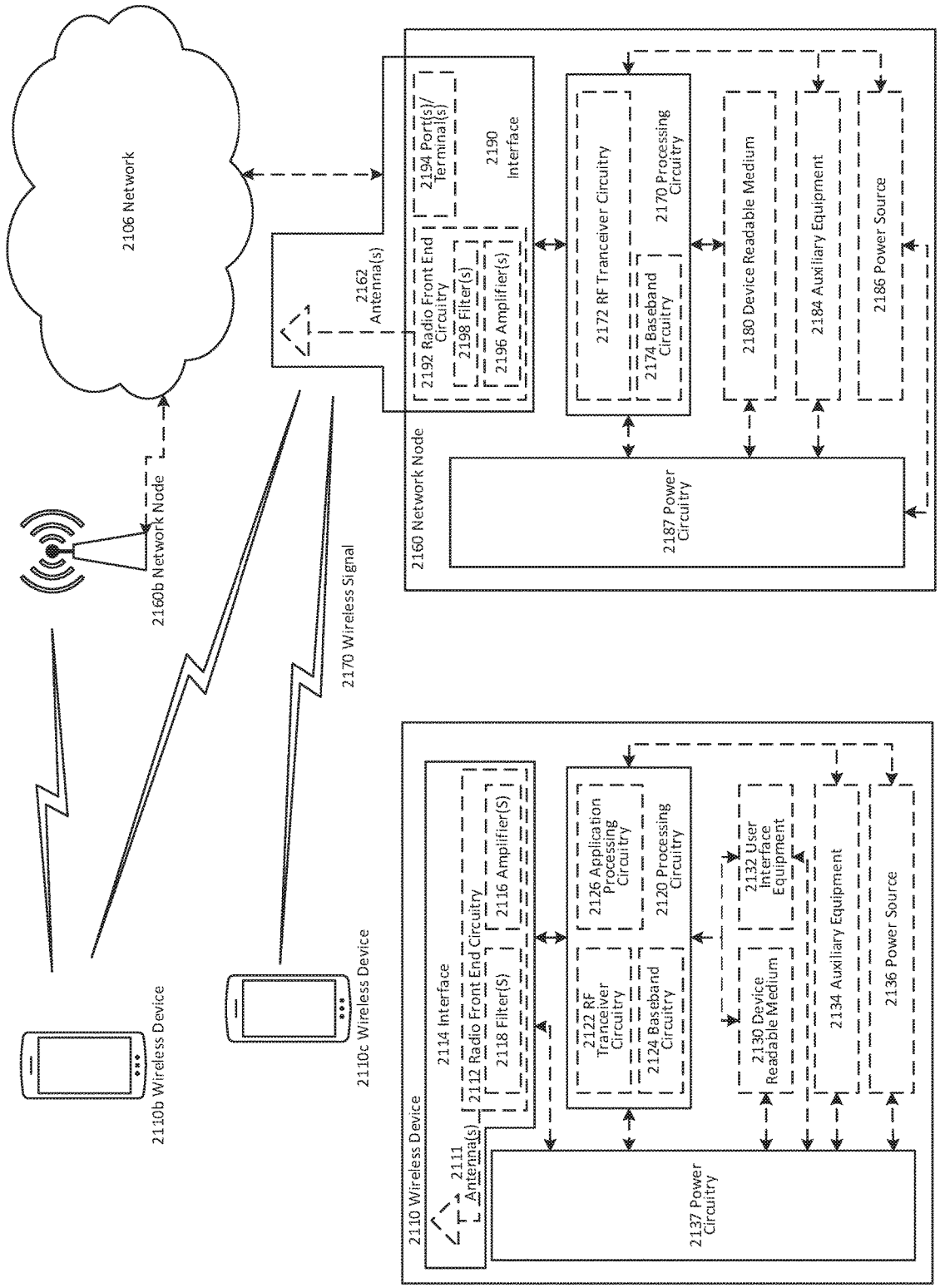
FIG. 14 is a schematic block diagram illustrating an example wireless network, according to particular embodiments of the present disclosure.

FIG. 9 illustrates a schematic block diagram of a wireless device 100 in a wireless network according to still other embodiments (for example, the wireless network shown in FIG. 14). As shown, the wireless device 100 implements various functional means, units, or modules, e.g., via the processing circuitry 110 in FIG. 8 and/or via software code. These functional means, units, or modules, e.g., for implementing the method(s) herein, include for instance a transmitting unit or module (220) configured to transmit an indication of a status of the wireless device 100 to a base station, the status being selected from a plurality of predefined statuses. The predefined statuses comprise a plurality of distinct aerial statuses, each of which indicates that the wireless device 100 is airborne. In some embodiments, these functional means, units, or modules further include a selecting unit or module (210) configured to select the status from the plurality of predefined statuses. In some embodiments, the predefined statuses further comprise at least one non-aerial status that indicates that the wireless device 100 is not airborne.

Figure 10:
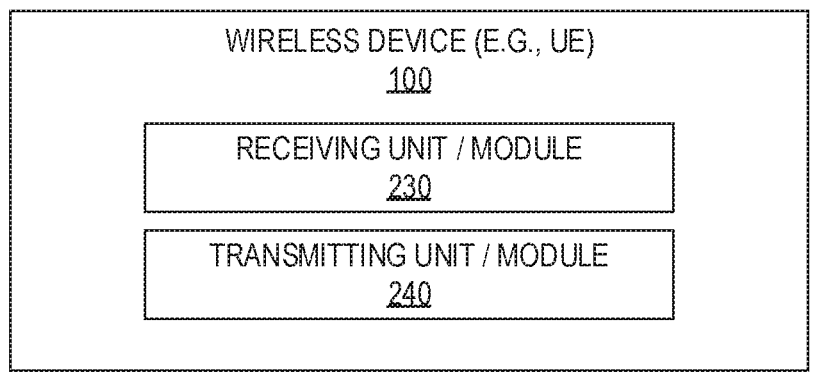

FIG. 10 illustrates a schematic block diagram of a wireless device 100 in a wireless network according to still other embodiments (for example, the wireless network shown in FIG. 14). As shown, the wireless device 100 implements various functional means, units, or modules, e.g., via the processing circuitry 110 in FIG. 8 and/or via software code. These functional means, units, or modules, e.g., for implementing the method(s) herein, include for instance a receiving unit or module (230) configured to receive, from a base station 300, a criteria for determining that the wireless device 100 has a status. The criteria comprises a height threshold. The functional means, units, or modules further include a transmitting unit or module (240) configured to transmit an indication of the status of the wireless device 100 to the base station 300.

Figure 11:
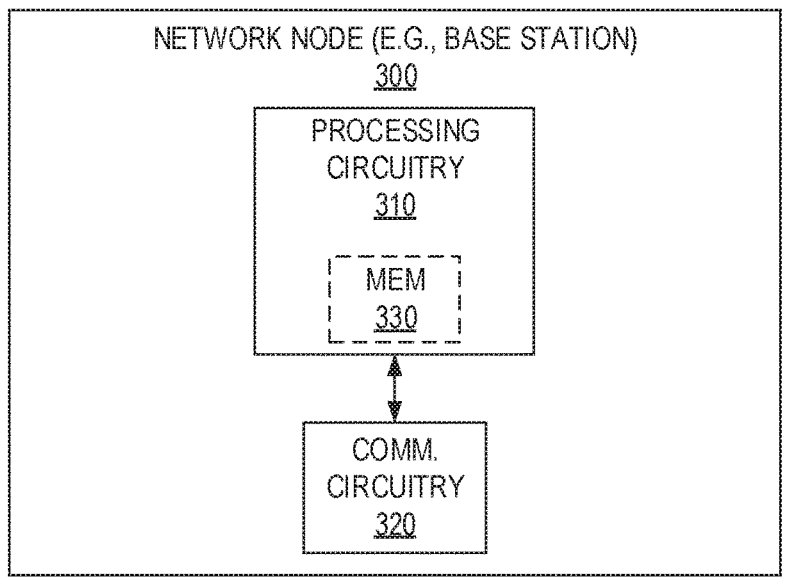
FIGS. 11-13 are schematic block diagrams illustrating example network nodes, according to one or more embodiments of the present disclosure.

FIG. 11 illustrates a network node 300 as implemented in accordance with one or more embodiments. As shown, the network node 300 includes processing circuitry 310 and communication circuitry 320. The communication circuitry 320 is configured to transmit and/or receive information to and/or from one or more other nodes, e.g., via any communication technology. The processing circuitry 310 is configured to perform processing described above, such as by executing instructions stored in memory 330. The processing circuitry 310 in this regard may implement certain functional means, units, or modules.

Figure 12:
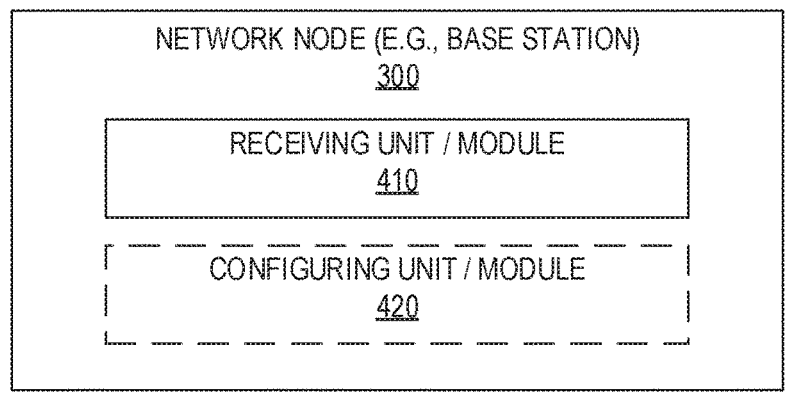
Figure 13:
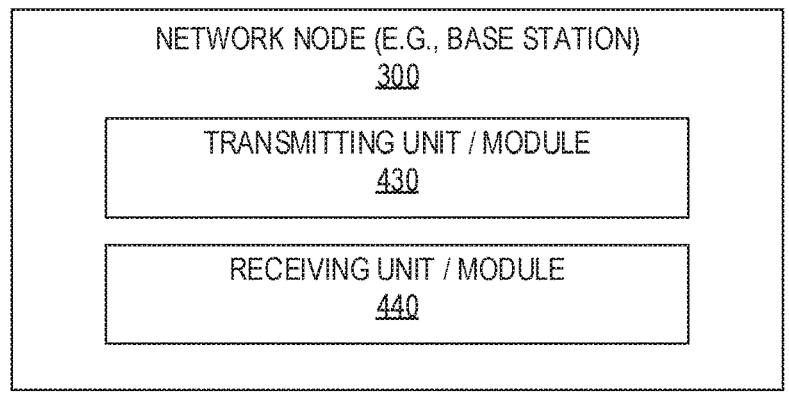

FIG. 12 illustrates a schematic block diagram of a network node 300 in a wireless network according to still other embodiments (for example, the wireless network shown in FIG. 14). As shown, the network node 300 implements various functional means, units, or modules, e.g., via the processing circuitry 310 in FIG. 11 and/or via software code. These functional means, units, or modules, e.g., for implementing the method(s) herein, include for instance a receiving unit or module (410) configured to receive an indication of the status of the wireless device 100, the status being one of a plurality of predefined statuses that the base station is configured to recognize. The predefined statuses comprise a plurality of distinct aerial statuses, each of which indicates that the wireless device 100 is airborne. In some embodiments, these functional means, units, or modules further include a configuring unit or module (420) configured to configure the wireless device 100 based on the status. In some embodiments, the predefined statuses further comprise at least one non-aerial status that indicates that the wireless device 100 is not airborne, FIG. 13 illustrates a schematic block diagram of a network node 300 in a wireless network according to still other embodiments (for example, the wireless network shown in FIG. 14). As shown, the network node 300 implements various functional means, units, or modules, e.g., via the processing circuitry 310 in FIG. 11 and/or via software code. These functional means, units, or modules, e.g., for implementing the method(s) herein, include for instance a transmitting unit or module (430) configured to transmit, to the wireless device 100, a criteria for determining that the wireless device 100 has the status. The criteria comprises a height threshold. These functional means, units, or modules further include a receiving unit or module (440) configured to receive an indication of the status of the wireless device 100.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In a particular example embodiment; a two-bit aerial UE flying status indication is used that has four distinctive states. Besides the three states "in-flight," "on-ground," and "hovering", a fourth-state may be UE-specifically configured, for example. Conditions for these states can be fixed in the appropriate communication standard, be configured in the UE by the network (e.g., speed/height thresholds), or come from drone devices.

In addition to reporting that the aerial UE flight status that it is 'in-flight' or 'on-ground', reporting 'hovering' as a flight status state is useful as the aerial UE has low mobility when it is hovering. When an aerial UE is hovering, eNB may, in some embodiments, more efficiently apply different interference mitigation schemes, especially those based on network coordination where delay is involved.

The fourth UE-specific state can be, for example: 1) high speed flight; 2) cruise flight; 3) flight following a path; 4) high altitude flight; 5) takeoff/landing; 6) remote controlled flight; 7) loss of GPS signal; 8) loss of remote controller signal; 9) Low battery warning; 10) other critical errors/exceptions.

Reporting "high speed flight" as a flight status may be useful in one or more embodiments. For example, the network may more efficiently apply different interference mitigation schemes and possibly mobility enhancing solutions in some such embodiments.

Reporting "cruise flight" as a flight status may be useful in one or more embodiments. Cruise flight is a flight phase that occurs when the UAV levels after a climb to a set altitude and before it begins to descend. With this information, the network may, for example, apply proper interference mitigation schemes and possibly mobility enhancing solutions.

Reporting 'flight following a path' as a flight status may be useful in one or more embodiments. For example, the network may use the trajectory of the flight path of the aerial UE to set up handovers in advance.

Reporting 'high altitude flight' as a flight status may be useful in one or more embodiments. For example, an aerial UE with high altitude may be configured with different power control, mobility management, radio resource allocation parameters compared to the UEs on the ground.

Reporting 'take off/landing' as a flight status may be useful in one or more embodiments. For example, when an aerial UE moves vertically during takeoff/landing, the signal it sees from the serving cell may be changing drastically.

Referring to FIG. 1, when the aerial UE is on the ground it is likely served by the main lobe of the serving eNB's antenna. As the aerial UE is taking off, it will likely transition from being served by the main lobe to being served by the sidelobe of the eNB antenna. This may result in drastic changes in the received signal from the served cell at the aerial UE which may lead to unnecessary handovers during takeoff. A similar situation may exist during landing where an aerial UE transitions from being served by the sidelobe of the eNB antenna to being served by the main lobe of the eNB antenna. To avoid unnecessary handovers during takeoff/landing of an aerial UE, it may be beneficial for the aerial UE to report take off/landing as one of the flight status states to the eNB. In some such embodiments, the eNB may restrict the aerial UE from performing frequent handovers during takeoff/landing. In an alternative embodiment, the aerial UE may report a vertical velocity instead of reporting takeoff/landing to the eNB. In one example of this alternative embodiment, a positive vertical velocity may correspond to takeoff and a negative vertical velocity may correspond to landing.

Reporting 'remote controlled flight' as a flight status may be useful in one or more embodiments. For example, this flight status may inform the network that the flight may be more irregular so that the network may apply more careful interference mitigation schemes and mobility enhancing solutions for the aerial UE.

Further embodiments include one or more states that are a combination of any of the above listed states, and may use any number of bits. The example of two bits with a fourth state as listed may be a particularly attractive embodiment for particular uses.

Furthermore, the UE may, in some embodiments, signal additional information based on the flight status. For example, in some embodiments the UE may additionally report information about the flight path being followed when reporting the following flight-path status.

Additional flight status information may be indicated as one or more of the flight status states to the network to enhance safety and operation of drone UEs beyond visual light of sight.

For example, reporting a loss of GPS signal to the network may help the network to configure mechanisms for drone controlling and monitoring. According to one such example, the network may configure position reference signals to facilitate drone positioning and navigation for safe operation of drones (e.g., in order to prevent the drone entering no-fly zones, avoiding potential crashes, etc.).

Further, in some embodiments, the UE may report inertial measurement unit (IMU) data obtained by the UE through sensor measurements. The report of such IMU data may enable the network to estimate the relative location of a UE (e.g., the relative displacement relative to the position where the GPS signal was lost).

Reporting loss of remote controller signal may be useful in one or more embodiments. A remote controller signal may be lost due to intentional causes (e.g., deactivation of the remote control) or unintentional causes (e.g., a software crash). Indicating this information to the network may, for example, help the network to take proper measures. Such measures may include, for example, the network indicating this information to UAV traffic management system 90 (e.g., as shown in FIG. 1), which may respond by executing emergency/exception handling procedures.

Reporting a low battery warning may be useful in one or more embodiments. For example, when battery is low, a drone (and/or corresponding software) may decide to activate certain operation, such as returning home. The estimated battery life may not be enough to support returning home, since the software may not be always accurate due to, e.g., not taking into account wind or other conditions. Reporting low battery information to the network may enable the network to communicate with UAV traffic management system 90 and, through use of drone positioning information, the network may take over control of the drone to ensure a safe landing.

Reporting other critical errors and exceptions may be useful in one or more embodiments. For example, flying drones may encounter other critical errors and exceptions that endanger safe operations, Indicating this information to the network may enable the network to take proper measures. For example, the network may indicate this information to a UAV traffic management system 90 that may respond by executing emergency/exception handling procedures.

The flight-status report may be transmitted by RRC in RRC_CONNECTED state. Alternatively, flight status information may be indicated to the network at the application layer. Additionally or alternatively, indicating via layer 1 and/or layer 2 may be performed according to one or more embodiments. The flight-status report can be a part of the measurement report. In another embodiment, the flight-status is a separate report.

In some embodiments, the wireless device 100 is periodically triggered to report flight-status based on a timer, Additionally or alternatively, the wireless device 100 may be triggered to report flight status based on an event. For example, the wireless device 100 may be triggered to report its flight status responsive to the UE detecting a change in flight-status. This detection may, for example, be performed by the UE based on a condition defined in a wireless communication standard, based on a condition configured by the network in the UE (e.g., in terms of one or more speed and/or height thresholds), and/or based on a condition specified by another device (e.g., another drone that has knowledge of the one or more flight statuses that the UE may report).

In some embodiments, such a triggering event may be a flight status change to a particular flight status state. In one example, an aerial UE may be triggered to report flight status responsive to the flight status changing to 'Low battery warning,' and for all other flight status state changes, a periodic reporting of flight status may be used. More generally stated, a UE may be configured (e.g., by a base station) to treat flight status changes to certain states as critical and whenever the flight status changes to these critical states, an event triggered flight status report is sent by the aerial UE to the eNB.

In some embodiments, flight status reporting may be triggered upon a network request. For example, in response to detecting a change in Doppler spread, location information, and/or in response to other information, the eNB may request flight status reporting from the UE. In another example, a change in the propagation environment may trigger the flight status request from eNB, given that a hovering aerial UE at higher altitude generally has less dynamical channel compared to a moving UAV.

The reported flight status may be used, in one or more embodiments, for enhancing automatic neighbor relation in network self-configuration. For example, a separate table for UE with flight-mode may be constructed for mobility enhancement.

In one or more embodiments, the network may switch between various Coordinated Multipoint (COMP) schemes (and the various cells associated in such co-ordination) based on the flight status. For example, a hovering aerial UE may not require highly dynamical cell selection compared to an aerial UE in motion.

Further, in some embodiments, flight status information may be communicated with UAV traffic management system 90 that can instruct proper network monitoring and control of UAVs when necessary.

In some embodiments, the flight-status indication may be used for handover decisions. The network typically consists of a mixture of smalls cells with less coverage, and macro nodes with a larger coverage. In handover regions, a small cell generally has better coverage than a macro node, but a handover to a small cell may be non-optimal if the UE is fast moving. This may be due to the signal strength of the small cell decreasing much faster in comparison to when performing a HO to the macro node. Given the flight status, the network may prioritize a HO to the macro cell with wider coverage for fast drones even if the small cell is stronger at the handover region.

In some such embodiments in which the flight-path is also reported, the network may use the trajectory to setup HOs in advance.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 2106, network nodes 2160 and 2160b, and WDs 2110, 2110b, and 2110c. In practice, a wireless network may further include any additional elements suitable to support communication between wireless devices or between a wireless device and another communication device, such as a landline telephone, a service provider, or any other network node or end device. Of the illustrated components, network node 2160 and wireless device (WD) 2110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2106 may comprise one or more backhaul networks, core networks, IP networks, public switched telephone networks (PSTNs), packet data networks, optical networks, wide-area networks (VVANs), local area networks (LANs), wireless local area networks (VVLANs), wired networks, wireless networks, metropolitan area networks, and other networks to enable communication between devices.

Network node 2160 and WD 2110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and New Radio (NR) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 2160 includes processing circuitry 2170, device readable medium 2180, interface 2190, auxiliary equipment 2184, power source 2186, power circuitry 2187, and antenna 2162. Although network node 2160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2160 are depicted as single boxes located within a larger box, or nested within multiple boxes, in practice, a network node may comprise multiple different physical components that make up a single illustrated component (e.g., device readable medium 2180 may comprise multiple separate hard drives as well as multiple RAM modules).

Similarly, network node 2160 may be composed of multiple physically separate components (e.g., a NodeB component and a RNC component, or a BTS component and a BSC component, etc.), which may each have their own respective components. In certain scenarios in which network node 2160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2160 may be configured to support multiple radio access technologies (RATs). In such embodiments, some components may be duplicated (e.g., separate device readable medium 2180 for the different RATs) and some components may be reused (e.g., the same antenna 2162 may be shared by the RATs). Network node 2160 may also include multiple sets of the various illustrated components for different wireless technologies integrated into network node 2160, such as, for example, GSM, Wide Code Division Multiplexing Access (WCDMA), LTE, NR, Wi-Fi, or Bluetooth wireless technologies. These wireless technologies may be integrated into the same or different chip or set of chips and other components within network node 2160.

Processing circuitry 2170 is configured to perform any determining, calculating, or similar operations (e.g., certain obtaining operations) described herein as being provided by a network node. These operations performed by processing circuitry 2170 may include processing information obtained by processing circuitry 2170 by, for example, converting the obtained information into other information, comparing the obtained information or converted information to information stored in the network node, and/or performing one or more operations based on the obtained information or converted information, and as a result of said processing making a determination.

Processing circuitry 2170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2160 components, such as device readable medium 2180, network node 2160 functionality. For example, processing circuitry 2170 may execute instructions stored in device readable medium 2180 or in memory within processing circuitry 2170. Such functionality may include providing any of the various wireless features, functions, or benefits discussed herein. In some embodiments, processing circuitry 2170 may include a system on a chip (SOC).

In some embodiments, processing circuitry 2170 may include one or more of radio frequency (RF) transceiver circuitry 2172 and baseband processing circuitry 2174. In some embodiments, radio frequency (RF) transceiver circuitry 2172 and baseband processing circuitry 2174 may be on separate chips (or sets of chips), boards, or units, such as radio units and digital units. In alternative embodiments, part or all of RF transceiver circuitry 2172 and baseband processing circuitry 2174 may be on the same chip or set of chips, boards, or units In certain embodiments, some or all of the functionality described herein as being provided by a network node, base station, eNB or other such network device may be performed by processing circuitry 2170 executing instructions stored on device readable medium 2180 or memory within processing circuitry 2170. In alternative embodiments, some or all of the functionality may be provided by processing circuitry 2170 without executing instructions stored on a separate or discrete device readable medium, such as in a hard-wired manner. In any of those embodiments, whether executing instructions stored on a device readable storage medium or not, processing circuitry 2170 can be configured to perform the described functionality. The benefits provided by such functionality are not limited to processing circuitry 2170 alone or to other components of network node 2160, but are enjoyed by network node 2160 as a whole, and/or by end users and the wireless network generally.

Device readable medium 2180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2170. Device readable medium 2180 may store any suitable instructions, data or information, including a computer program, software, an application including one or more of logic, rules, code, tables, etc. and/or other instructions capable of being executed by processing circuitry 2170 and, utilized by network node 2160. Device readable medium 2180 may be used to store any calculations made by processing circuitry 2170 and/or any data received via interface 2190. In some embodiments, processing circuitry 2170 and device readable medium 2180 may be considered to be integrated.

Interface 2190 is used in the wired or wireless communication of signalling and/or data between network node 2160, network 2106, and/or WDs 2110. As illustrated, interface 2190 comprises port(s)/terminal(s) 2194 to send and receive data, for example to and from network 2106 over a wired connection. Interface 2190 also includes radio front end circuitry 2192 that may be coupled to, or in certain embodiments a part of, antenna 2162. Radio front end circuitry 2192 comprises filters 2198 and amplifiers 2196. Radio front end circuitry 2192 may be connected to antenna 2162 and processing circuitry 2170. Radio front end circuitry may be configured to condition signals communicated between antenna 2162 and processing circuitry 2170. Radio front end circuitry 2192 may receive digital data that is to be sent out to other network nodes or WDs via a wireless connection. Radio front end circuitry 2192 may convert the digital data into a radio signal having the appropriate channel and bandwidth parameters using a combination of filters 2198 and/or amplifiers 2196, The radio signal may then be transmitted via antenna 2162. Similarly, when receiving data, antenna 2162 may collect radio signals which are then converted into digital data by radio front end circuitry 2192. The digital data may be passed to processing circuitry 2170. In other embodiments, the interface may comprise different components and/or different combinations of components.

In certain alternative embodiments, network node 2160 may not include separate radio front end circuitry 2192, instead, processing circuitry 2170 may comprise radio front end circuitry and may be connected to antenna 2162 without separate radio front end circuitry 2192. Similarly, in some embodiments, all or some of RF transceiver circuitry 2172 may be considered a part of interface 2190. In still other embodiments, interface 2190 may include one or more ports or terminals 2194, radio front end circuitry 2192, and RF transceiver circuitry 2172, as part of a radio unit (not shown), and interface 2190 may communicate with baseband processing circuitry 2174, which is part of a digital unit (not shown).

Antenna 2162 may include one or more antennas, or antenna arrays, configured to send and/or receive wireless signals. Antenna 2162 may be coupled to radio front end circuitry 2190 and may be any type of antenna capable of transmitting and receiving data and/or signals wirelessly. In some embodiments, antenna 2162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO, In certain embodiments, antenna 2162 may be separate from network node 2160 and may be connectable to network node 2160 through an interface or port.

Antenna 2162, interface 2190, and/or processing circuitry 2170 may be configured to perform any receiving operations and/or certain obtaining operations described herein as being performed by a network node. Any information, data and/or signals may be received from a wireless device, another network node and/or any other network equipment. Similarly, antenna 2162, interface 2190, and/or processing circuitry 2170 may be configured to perform any transmitting operations described herein as being performed by a network node. Any information, data and/or signals may be transmitted to a wireless device, another network node and/or any other network equipment.

Power circuitry 2187 may comprise, or be coupled to, power management circuitry and is configured to supply the components of network node 2160 with power for performing the functionality described herein. Power circuitry 2187 may receive power from power source 2186. Power source 2186 and/or power circuitry 2187 may be configured to provide power to the various components of network node 2160 in a form suitable for the respective components (e.g., at a voltage and current level needed for each respective component). Power source 2186 may either be included in, or external to, power circuitry 2187 and/or network node 2160. For example, network node 2160 may be connectable to an external power source (e.g., an electricity outlet) via an input circuitry or interface such as an electrical cable, whereby the external power source supplies power to power circuitry 2187. As a further example, power source 2186 may comprise a source of power in the form of a battery or battery pack which is connected to, or integrated in, power circuitry 2187. The battery may provide backup power should the external power source fail. Other types of power sources, such as photovoltaic devices, may also be used.

Alternative embodiments of network node 2160 may include additional components beyond those shown in FIG. 14 that may be responsible for providing certain aspects of the network node's functionality, including any of the functionality described herein and/or any functionality necessary to support the subject matter described herein. For example, network node 2160 may include user interface equipment to allow input of information into network node 2160 and to allow output of information from network node 2160. This may allow a user to perform diagnostic, maintenance, repair, and other administrative functions for network node 2160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an IoT scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP NB-IoT standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2110 includes antenna 2111, interface 2114, processing circuitry 2120, device readable medium 2130, user interface equipment 2132, auxiliary equipment 2134, power source 2136 and power circuitry 2137. WD 2110 may include multiple sets of one or more of the illustrated components for different wireless technologies supported by WD 2110, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within WD 2110.

Antenna 2111 may include one or more antennas or antenna arrays, configured to send and/or receive wireless signals, and is connected to interface 2114. In certain alternative embodiments, antenna 2111 may be separate from WD 2110 and be connectable to WD 2110 through an interface or port. Antenna 2111, interface 2114, and/or processing circuitry 2120 may be configured to perform any receiving or transmitting operations described herein as being performed by a WD. Any information, data and/or signals may be received from a network node and/or another WD. In some embodiments, radio front end circuitry and/or antenna 2111 may be considered an interface.

As illustrated, interface 2114 comprises radio front end circuitry 2112 and antenna 2111. Radio front end circuitry 2112 comprise one or more filters 2118 and amplifiers 2116. Radio front end circuitry 2114 is connected to antenna 2111 and processing circuitry 2120, and is configured to condition signals communicated between antenna 2111 and processing circuitry 2120. Radio front end circuitry 2112 may be coupled to or a part of antenna 2111. In some embodiments, WD 2110 may not include separate radio front end circuitry 2112; rather; processing circuitry 2120 may comprise radio front end circuitry and may be connected to antenna 2111. Similarly; in some embodiments, some or all of RF transceiver circuitry 2122 may be considered a part of interface 2114. Radio front end circuitry 2112 may receive digital data that is to be sent out to other network nodes or WDs via a wireless connection. Radio front end circuitry 2112 may convert the digital data into a radio signal having the appropriate channel and bandwidth parameters using a combination of filters 2118 and/or amplifiers 2116, The radio signal may then be transmitted via antenna 2111. Similarly, when receiving data, antenna 2111 may collect radio signals which are then converted into digital data by radio front end circuitry 2112. The digital data may be passed to processing circuitry 2120. In other embodiments, the interface may comprise different components and/or different combinations of components.

Processing circuitry 2120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2110 components; such as device readable medium 2130, WD 2110 functionality. Such functionality may include providing any of the various wireless features or benefits discussed herein. For example, processing circuitry 2120 may execute instructions stored in device readable medium 2130 or in memory within processing circuitry 2120 to provide the functionality disclosed herein.

As illustrated, processing circuitry 2120 includes one or more of RF transceiver circuitry 2122, baseband processing circuitry 2124, and application processing circuitry 2126. In other embodiments, the processing circuitry may comprise different components and/or different combinations of components. In certain embodiments processing circuitry 2120 of WD 2110 may comprise a SOC. In some embodiments, RF transceiver circuitry 2122; baseband processing circuitry 2124, and application processing circuitry 2126 may be on separate chips or sets of chips. In alternative embodiments, part or all of baseband processing circuitry 2124 and application processing circuitry 2126 may be combined into one chip or set of chips, and RF transceiver circuitry 2122 may be on a separate chip or set of chips. In still alternative embodiments, part or all of RF transceiver circuitry 2122 and baseband processing circuitry 2124 may be on the same chip or set of chips, and application processing circuitry 2126 may be on a separate chip or set of chips. In yet other alternative embodiments, part or all of RF transceiver circuitry 2122, baseband processing circuitry 2124, and application processing circuitry 2126 may be combined in the same chip or set of chips. In some embodiments, RF transceiver circuitry 2122 may be a part of interface 2114. RF transceiver circuitry 2122 may condition RF signals for processing circuitry 2120.

In certain embodiments, some or all of the functionality described herein as being performed by a WD may be provided by processing circuitry 2120 executing instructions stored on device readable medium 2130, which in certain embodiments may be a computer-readable storage medium. In alternative embodiments, some or all of the functionality may be provided by processing circuitry 2120 without executing instructions stored on a separate or discrete device readable storage medium, such as in a hard-wired manner. In any of those particular embodiments, whether executing instructions stored on a device readable storage medium or not, processing circuitry 2120 can be configured to perform the described functionality. The benefits provided by such functionality are not limited to processing circuitry 2120 alone or to other components of WD 2110, but are enjoyed by WD 2110 as a whole, and/or by end users and the wireless network generally.

Processing circuitry 2120 may be configured to perform any determining, calculating, or similar operations (e.g., certain obtaining operations) described herein as being performed by a WD. These operations, as performed by processing circuitry 2120, may include processing information obtained by processing circuitry 2120 by, for example, converting the obtained information into other information; comparing the obtained information or converted information to information stored by WD 2110, and/or performing one or more operations based on the obtained information or converted information, and as a result of said processing making a determination.

Device readable medium 2130 may be operable to store a computer program, software, an application including one or more of logic, rules, code, tables, etc. and/or other instructions capable of being executed by processing circuitry 2120. Device readable medium 2130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2120. In some embodiments, processing circuitry 2120 and device readable medium 2130 may be considered to be integrated.

User interface equipment 2132 may provide components that allow for a human user to interact with WD 2110. Such interaction may be of many forms, such as visual, audial, tactile, etc. User interface equipment 2132 may be operable to produce output to the user and to allow the user to provide input to WD 2110. The type of interaction may vary depending on the type of user interface equipment 2132 installed in WD 2110. For example, if WD 2110 is a smart phone, the interaction may be via a touch screen: if WD 2110 is a smart meter, the interaction may be through a screen that provides usage (e.g., the number of gallons used) or a speaker that provides an audible alert (e.g., if smoke is detected). User interface equipment 2132 may include input interfaces, devices and circuits, and output interfaces, devices and circuits, User interface equipment 2132 is configured to allow input of information into WD 2110, and is connected to processing circuitry 2120 to allow processing circuitry 2120 to process the input information. User interface equipment 2132 may include, for example, a microphone, a proximity or other sensor, keys/buttons, a touch display, one or more cameras, a USB port, or other input circuitry. User interface equipment 2132 is also configured to allow output of information from WD 2110, and to allow processing circuitry 2120 to output information from WD 2110. User interface equipment 2132 may include, for example, a speaker, a display, vibrating circuitry, a USB port, a headphone interface, or other output circuitry. Using one or more input and output interfaces, devices, and circuits, of user interface equipment 2132, WD 2110 may communicate with end users and/or the wireless network, and allow them to benefit from the functionality described herein.

Auxiliary equipment 2134 is operable to provide more specific functionality which may not be generally performed by WDs. This may comprise specialized sensors for doing measurements for various purposes, interfaces for additional types of communication such as wired communications etc. The inclusion and type of components of auxiliary equipment 2134 may vary depending on the embodiment and/or scenario.

Power source 2136 may, in some embodiments, be in the form of a battery or battery pack. Other types of power sources, such as an external power source (e.g., an electricity outlet), photovoltaic devices or power cells, may also be used. WD 2110 may further comprise power circuitry 2137 for delivering power from power source 2136 to the various parts of WD 2110 which need power from power source 2136 to carry out any functionality described or indicated herein, Power circuitry 2137 may in certain embodiments comprise power management circuitry. Power circuitry 2137 may additionally or alternatively be operable to receive power from an external power source; in which case WD 2110 may be connectable to the external power source (such as an electricity outlet) via input circuitry or an interface such as an electrical power cable. Power circuitry 2137 may also in certain embodiments be operable to deliver power from an external power source to power source 2136. This may be, for example, for the charging of power source 2136. Power circuitry 2137 may perform any formatting, converting, or other modification to the power from power source 2136 to make the power suitable for the respective components of WD 2110 to which power is supplied.

Figure 15:
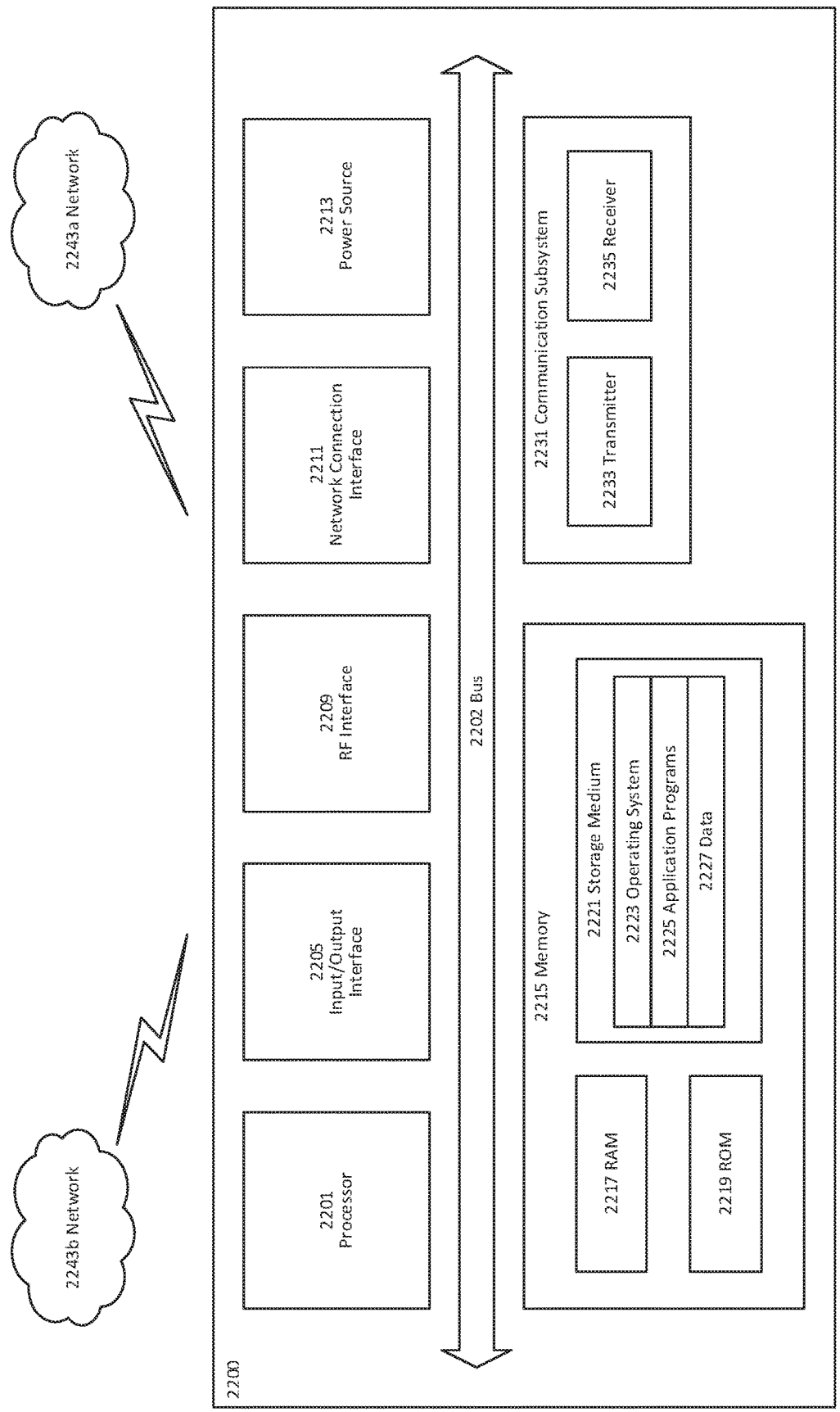
FIG. 15 is a schematic block diagram illustrating an example of a user equipment, according to particular embodiments of the present disclosure.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller), Alternatively, a UE may represent a device that is not intended for sale to, or operation by, an end user but which may be associated with or operated for the benefit of a user (e.g., a smart power meter). UE 22200 may be any UE identified by the $3^{rd}$ Generation Partnership Project (3GPP), including a NB-IoT UE, a machine type communication (MTC) UE, and/or an enhanced MTC (eMTC) UE, UE 2200, as illustrated in FIG. 15, is one example of a WD configured for communication in accordance with one or more communication standards promulgated by the $3^{rd}$ Generation Partnership Project (3GPP), such as 3GPP's GSM, UMTS, LIE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 2200 includes processing circuitry 2201 that is operatively coupled to input/output interface 2205, radio frequency (RF) interface 2209, network connection interface 2211, memory 2215 including random access memory (RAM) 2217, read-only memory (ROM) 2219, and storage medium 2221 or the like, communication subsystem 2231, power source 2233, and/or any other component, or any combination thereof. Storage medium 2221 includes operating system 2223, application program 2225, and data 2227. In other embodiments, storage medium 2221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 2201 may be configured to process computer instructions and data. Processing circuitry 2201 may be configured to implement any sequential state machine operative to execute machine instructions stored as machine-readable computer programs in the memory, such as one or more hardware-implemented state machines (e.g., in discrete logic, FPGA, ASIC, etc.): programmable logic together with appropriate firmware; one or more stored program, general-purpose processors, such as a microprocessor or Digital Signal Processor (DSP), together with appropriate software; or any combination of the above. For example, the processing circuitry 2201 may include two central processing units (CPUs). Data may be information in a form suitable for use by a computer.

In the depicted embodiment, input/output interface 2205 may be configured to provide a communication interface to an input device, output device, or input and output device. UE 2200 may be configured to use an output device via input/output interface 2205. An output device may use the same type of interface port as an input device. For example, a USB port may be used to provide input to and output from UE 2200. The output device may be a speaker, a sound card, a video card, a display, a monitor, a printer, an actuator, an emitter, a smartcard, another output device, or any combination thereof. UE 2200 may be configured to use an input device via input/output interface 2205 to allow a user to capture information into UE 2200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 2209 may be configured to provide a communication interface to RF components such as a transmitter, a receiver, and an antenna. Network connection interface 2211 may be configured to provide a communication interface to network 2243a. Network 2243a may encompass wired and/or wireless networks such as a local-area network (LAN), a wide-area network (WAN), a computer network, a wireless network, a telecommunications network, another like network or any combination thereof. For example, network 2243a may comprise a Wi-Fi network. Network connection interface 2211 may be configured to include a receiver and a transmitter interface used to communicate with one or more other devices over a communication network according to one or more communication protocols, such as Ethernet, TCP/IP, SONET, ATM, or the like. Network connection interface 2211 may implement receiver and transmitter functionality appropriate to the communication network links (e.g., optical, electrical, and the like). The transmitter and receiver functions may share circuit components, software or firmware, or alternatively may be implemented separately. RAM 2217 may be configured to interface via bus 2202 to processing circuitry 2201 to provide storage or caching of data or computer instructions during the execution of software programs such as the operating system, application programs, and device drivers. ROM 2219 may be configured to provide computer instructions or data to processing circuitry 2201. For example, ROM 2219 may be configured to store invariant low-level system code or data for basic system functions such as basic input and output (I/O), startup, or reception of keystrokes from a keyboard that are stored in a non-volatile memory. Storage medium 2221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2221 may be configured to include operating system 2223, application program 2225 such as a web browser application, a widget or gadget engine or another application, and data file 2227. Storage medium 2221 may store, for use by UE 2200, any of a variety of various operating systems or combinations of operating systems.

Storage medium 2221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2221 may allow UE 2200 to access computer-executable instructions, application programs or the like, stored on transitory or non-transitory memory media, to off-load data, or to upload data, An article of manufacture, such as one utilizing a communication system may be tangibly embodied in storage medium 2221, which may comprise a device readable medium.

In FIG. 15, processing circuitry 2201 may be configured to communicate with network 2243*b* using communication subsystem 2231. Network 2243*a* and network 2243*b* may be the same network or networks or different network or networks, Communication subsystem 2231 may be configured to include one or more transceivers used to communicate with network 2243*b*. For example, communication subsystem 2231 may be configured to include one or more transceivers used to communicate with one or more remote transceivers of another device capable of wireless communication such as another WD, UE, or base station of a radio access network (RAN) according to one or more communication protocols, such as IEEE 802.11, Code Division Multiplexing Access (CDMA), WCDMA, GSM, LTE, UTRAN, WiMax, or the like. Each transceiver may include transmitter 2233 and/or receiver 2235 to implement transmitter or receiver functionality, respectively, appropriate to the RAN links (e.g., frequency allocations and the like). Further, transmitter 2233 and receiver 2235 of each transceiver may share circuit components, software or firmware, or alternatively may be implemented separately.

In the illustrated embodiment, the communication functions of communication subsystem 2231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2231 may include cellular communication, Wi-Fi communication, Bluetooth communication, and GPS communication. Network 2243*b* may encompass wired and/or wireless networks such as a local-area network (LAN), a wide-area network (WAN), a computer network, a wireless network, a telecommunications network, another like network or any combination thereof. For example, network 2243*b* may be a cellular network, a Wi-Fi network, and/or a near-field network. Power source 2213 may be configured to provide alternating current (AC) or direct current (DC) power to components of UE 2200.

The features, benefits and/or functions described herein may be implemented in one of the components of UE 2200 or partitioned across multiple components of UE 2200. Further, the features, benefits, and/or functions described herein may be implemented in any combination of hardware, software or firmware. In one example, communication subsystem 2231 may be configured to include any of the components described herein. Further, processing circuitry 2201 may be configured to communicate with any of such components over bus 2202. In another example, any of such components may be represented by program instructions stored in memory that when executed by processing circuitry 2201 perform the corresponding functions described herein. In another example, the functionality of any of such components may be partitioned between processing circuitry 2201 and communication subsystem 2231. In another example, the non-computationally intensive functions of any of such components may be implemented in software or firmware and the computationally intensive functions may be implemented in hardware.

Figure 16:
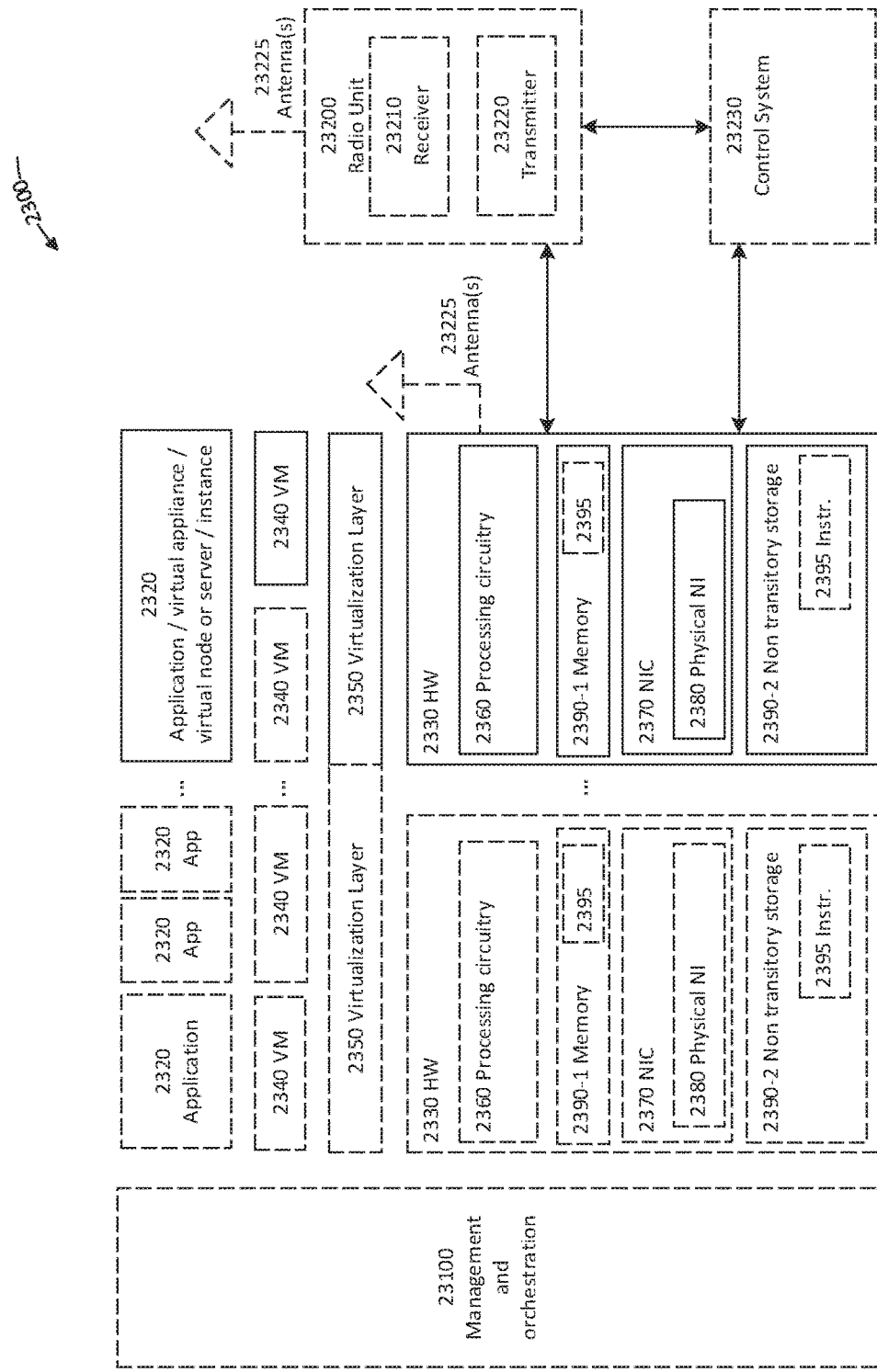
FIG. 16 is a schematic block diagram illustrating an example of a virtualization environment, according to particular embodiments of the present disclosure.

FIG. 16 is a schematic block diagram illustrating a virtualization environment 2300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2300 hosted by one or more of hardware nodes 2330.

Further, in embodiments in which the virtual node is not a radio access node or does not require radio connectivity (e.g., a core network node), then the network node may be entirely virtualized.

The functions may be implemented by one or more applications 2320 (which may alternatively be called software instances, virtual appliances, network functions, virtual nodes, virtual network functions, etc.) operative to implement some of the features, functions, and/or benefits of some of the embodiments disclosed herein. Applications 2320 are run in virtualization environment 2300 which provides hardware 2330 comprising processing circuitry 2360 and memory 2390. Memory 2390 contains instructions 2395 executable by processing circuitry 2360 whereby application 2320 is operative to provide one or more of the features, benefits, and/or functions disclosed herein.

Virtualization environment 2300, comprises general-purpose or special-purpose network hardware devices 2330 comprising a set of one or more processors or processing circuitry 2360, which may be commercial off-the-shelf (COTS) processors, dedicated Application Specific Integrated Circuits (ASICs), or any other type of processing circuitry including digital or analog hardware components or special purpose processors, Each hardware device may comprise memory 2390-1 which may be non-persistent memory for temporarily storing instructions 2395 or software executed by processing circuitry 2360. Each hardware device may comprise one or more network interface controllers (NICs) 2370, also known as network interface cards, which include physical network interface 2380. Each hardware device may also include non-transitory, persistent, machine-readable storage media 2390-2 having stored therein software 2395 and/or instructions executable by processing circuitry 2360. Software 2395 may include any type of software including software for instantiating one or more virtualization layers 2350 (also referred to as hypervisors), software to execute virtual machines 2340 as well as software allowing it to execute functions, features and/or benefits described in relation with some embodiments described herein.

Virtual machines 2340, comprise virtual processing, virtual memory, virtual networking or interface and virtual storage, and may be run by a corresponding virtualization layer 2350 or hypervisor. Different embodiments of the instance of virtual appliance 2320 may be implemented on one or more of virtual machines 2340, and the implementations may be made in different ways.

During operation, processing circuitry 2360 executes software 2395 to instantiate the hypervisor or virtualization layer 2350, which may sometimes be referred to as a virtual machine monitor (VMM). Virtualization layer 2350 may present a virtual operating platform that appears like networking hardware to virtual machine 2340.

As shown in FIG. 16, hardware 2330 may be a standalone network node with generic or specific components. Hardware 2330 may comprise antenna 23225 and may implement some functions via virtualization. Alternatively, hardware 2330 may be part of a larger cluster of hardware (e.g. such as in a data center or customer premise equipment (CPE)) where many hardware nodes work together and are managed via management and orchestration (MANO) 23100, which, among others, oversees lifecycle management of applications 2320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2340 may be a software implementation of a physical machine that runs programs as if they were executing on a physical, non-virtualized machine. Each of virtual machines 2340, and that part of hardware 2330 that executes that virtual machine, be it hardware dedicated to that virtual machine and/or hardware shared by that virtual machine with others of the virtual machines 2340, forms a separate virtual network elements (NNE).

Still in the context of NFV, Virtual Network Function (VNF) is responsible for handling specific network functions that run in one or more virtual machines 2340 on top of hardware networking infrastructure 2330 and corresponds to application 2320 in FIG. 16.

In some embodiments, one or more radio units 23200 that each includes one or more transmitters 23220 and one or more receivers 23210 may be coupled to one or more antennas 23225, Radio units 23200 may communicate directly with hardware nodes 2330 via one or more appropriate network interfaces and may be used in combination with the virtual components to provide a virtual node with radio capabilities, such as a radio access node or a base station.

In some embodiments, some signalling can be effected with the use of control system 23230 which may alternatively be used for communication between the hardware nodes 2330 and radio units 23200.

Figure 17:
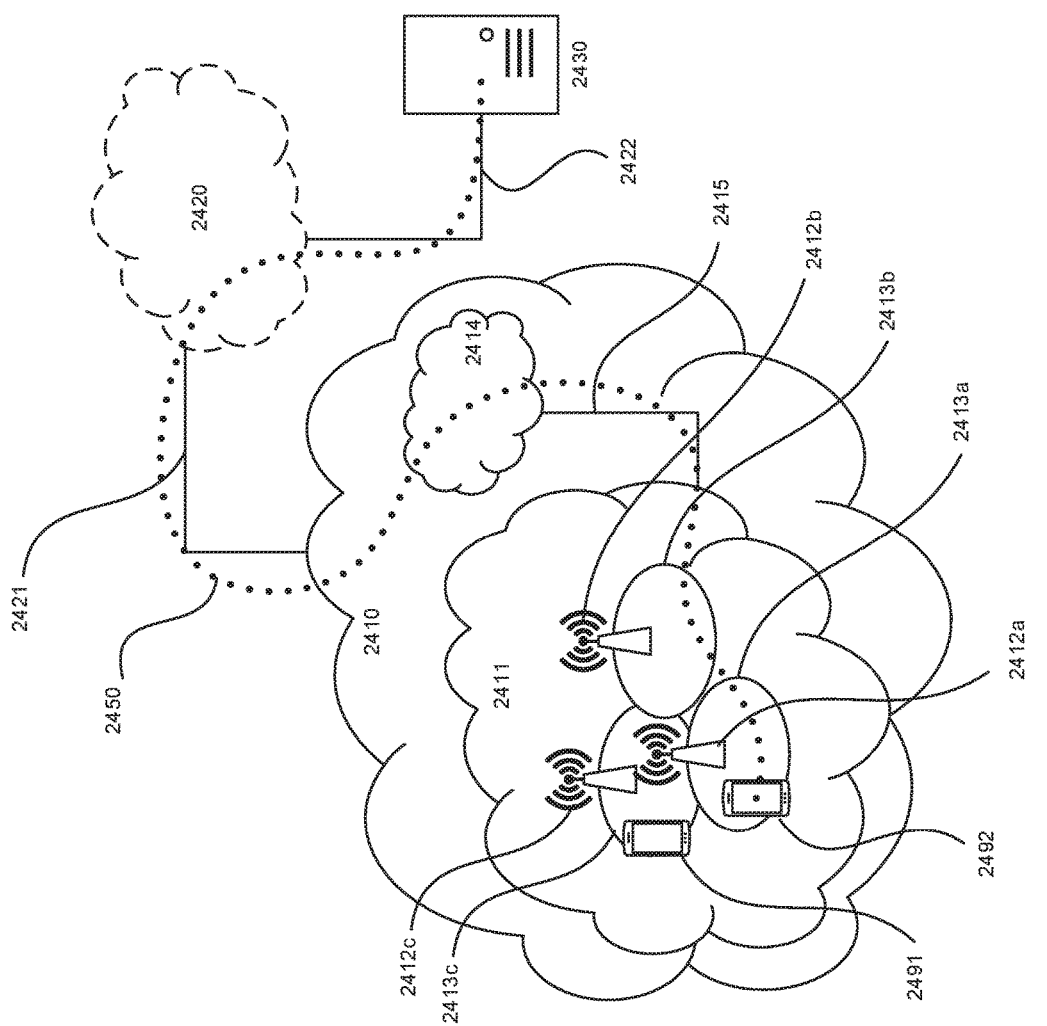
FIG. 17 is a schematic illustrating an example telecommunication network, according to particular embodiments of the present disclosure.

FIG. 17 illustrates a telecommunication network connected via an intermediate network to a host computer in accordance with some embodiments. In particular, with reference to FIG. 17, in accordance with an embodiment, a communication system includes telecommunication network 2410, such as a 3GPP-type cellular network, which comprises access network 2411, such as a radio access network, and core network 2414. Access network 2411 comprises a plurality of base stations 2412a, 2412b, 2412c, such as NBs, eNBs, gNBs or other types of wireless access points, each defining a corresponding coverage area 2413a, 2413b, 2413c. Each base station 2412a, 2412b, 2412c is connectable to core network 2414 over a wired or wireless connection 2415. A first UE 2491 located in coverage area 2413c is configured to wirelessly connect to, or be paged by, the corresponding base station 2412c. A second UE 2492 in coverage area 2413a is wirelessly connectable to the corresponding base station 2412a. While a plurality of UEs 2491, 2492 are illustrated in this example, the disclosed embodiments are equally applicable to a situation where a sole UE is in the coverage area or where a sole UE is connecting to the corresponding base station 2412.

Telecommunication network 2410 is itself connected to host computer 2430, which may be embodied in the hardware and/or software of a standalone server, a cloud-implemented server, a distributed server or as processing resources in a server farm. Host computer 2430 may be under the ownership or control of a service provider, or may be operated by the service provider or on behalf of the service provider. Connections 2421 and 2422 between telecommunication network 2410 and host computer 2430 may extend directly from core network 2414 to host computer 2430 or may go via an optional intermediate network 2420. Intermediate network 2420 may be one of, or a combination of more than one of, a public, private or hosted network; intermediate network 2420, if any, may be a backbone network or the Internet; in particular, intermediate network 2420 may comprise two or more sub-networks (not shown).

The communication system of FIG. 17 as a whole enables connectivity between the connected UEs 2491, 2492 and host computer 2430. The connectivity may be described as an over-the-top (OTT) connection 2450. Host computer 2430 and the connected UEs 2491, 2492 are configured to communicate data and/or signaling via OTT connection 2450, using access network 2411, core network 2414, any intermediate network 2420 and possible further infrastructure (not shown) as intermediaries. OTT connection 2450 may be transparent in the sense that the participating communication devices through which OTT connection 2450 passes are unaware of routing of uplink and downlink communications. For example, base station 2412 may not or need not be informed about the past routing of an incoming downlink communication with data originating from host computer 2430 to be forwarded (e.g., handed over) to a connected UE 2491. Similarly, base station 2412 need not be aware of the future routing of an outgoing uplink communication originating from the UE 2491 towards the host computer 2430.

Figure 18:
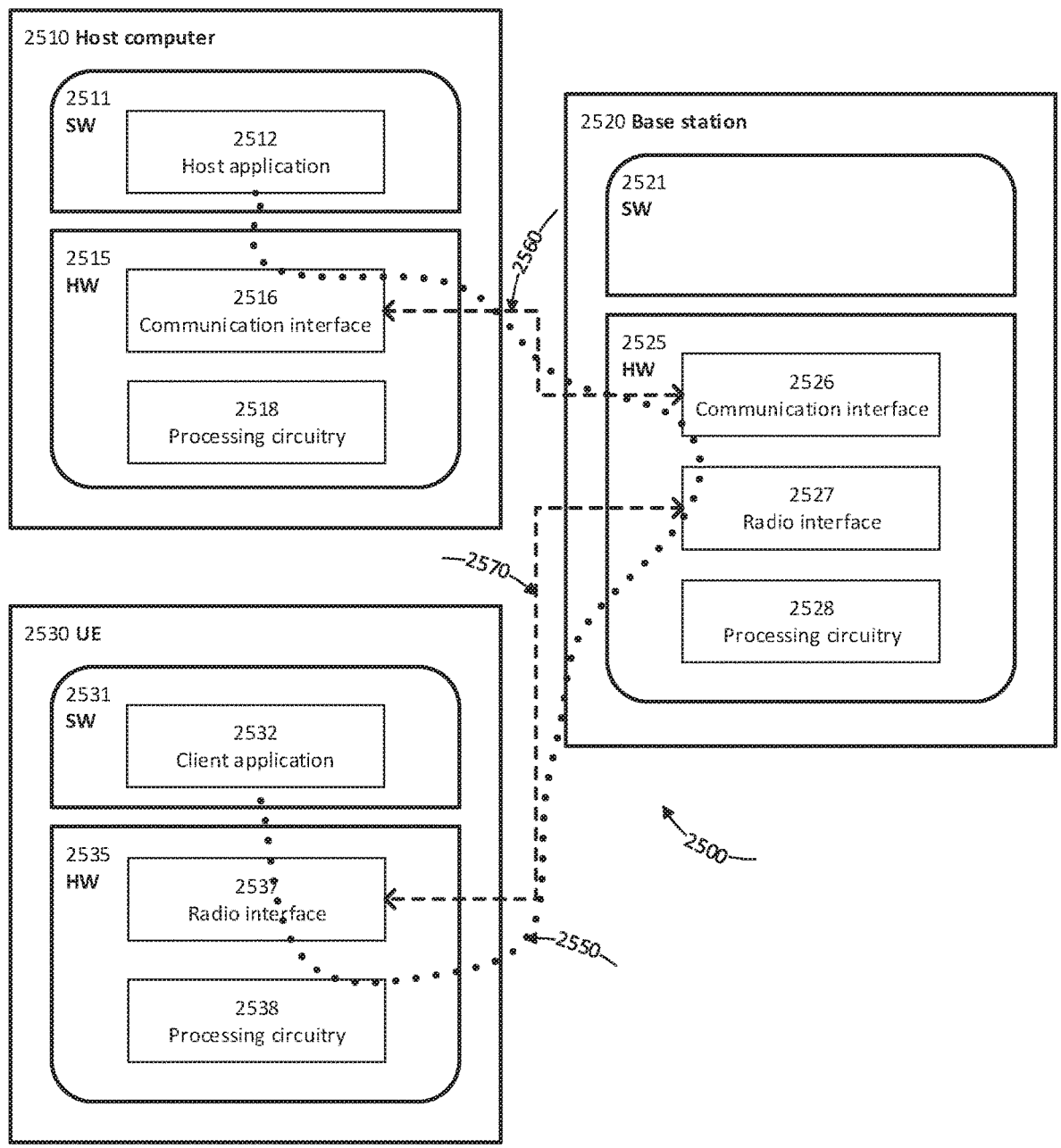
FIG. 18 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 2500, host computer 2510 comprises hardware 2515 including communication interface 2516 configured to set up and maintain a wired or wireless connection with an interface of a different communication device of communication system 2500. Host computer 2510 further comprises processing circuitry 2518, which may have storage and/or processing capabilities. In particular, processing circuitry 2518 may comprise one or more programmable processors, application-specific integrated circuits, field programmable gate arrays or combinations of these (not shown) adapted to execute instructions. Host computer 2510 further comprises software 2511, which is stored in or accessible by host computer 2510 and executable by processing circuitry 2518. Software 2511 includes host application 2512. Host application 2512 may be operable to provide a service to a remote user, such as UE 2530 connecting via OTT connection 2550 terminating at UE 2530 and host computer 2510. In providing the service to the remote user, host application 2512 may provide user data which is transmitted using OTT connection 2550.

Communication system 2500 further includes base station 2520 provided in a telecommunication system and comprising hardware 2525 enabling it to communicate with host computer 2510 and with UE 2530. Hardware 2525 may include communication interface 2526 for setting up and maintaining a wired or wireless connection with an interface of a different communication device of communication system 2500, as well as radio interface 2527 for setting up and maintaining at least wireless connection 2570 with UE 2530 located in a coverage area (not shown in FIG. 18) served by base station 2520. Communication interface 2526 may be configured to facilitate connection 2560 to host computer 2510. Connection 2560 may be direct or it may pass through a core network (not shown in FIG. 18) of the telecommunication system and/or through one or more intermediate networks outside the telecommunication system. In the embodiment shown, hardware 2525 of base station 2520 further includes processing circuitry 2528, which may comprise one or more programmable processors, application-specific integrated circuits, field programmable gate arrays or combinations of these (not shown) adapted to execute instructions. Base station 2520 further has software 2521 stored internally or accessible via an external connection.

Communication system 2500 further includes UE 2530 already referred to. Its hardware 2535 may include radio interface 2537 configured to set up and maintain wireless connection 2570 with a base station serving a coverage area in which UE 2530 is currently located. Hardware 2535 of UE 2530 further includes processing circuitry 2538, which may comprise one or more programmable processors, application-specific integrated circuits, field programmable gate arrays or combinations of these (not shown) adapted to execute instructions. UE 2530 further comprises software 2531, which is stored in or accessible by UE 2530 and executable by processing circuitry 2538. Software 2531 includes client application 2532. Client application 2532 may be operable to provide a service to a human or non-human user via UE 2530, with the support of host computer 2510. In host computer 2510, an executing host application 2512 may communicate with the executing client application 2532 via OTT connection 2550 terminating at UE 2530 and host computer 2510. In providing the service to the user, client application 2532 may receive request data from host application 2512 and provide user data in response to the request data. OTT connection 2550 may transfer both the request data and the user data. Client application 2532 may interact with the user to generate the user data that it provides.

It is noted that host computer 2510, base station 2520 and UE 2530 illustrated in FIG. 18 may be similar or identical to host computer 2430, one of base stations 2412a, 2412b, 2412c and one of UEs 2491, 2492 of FIG. 17, respectively. This is to say, the inner workings of these entities may be as shown in FIG. 18 and independently, the surrounding network topology may be that of FIG. 17.

In FIG. 18, OTT connection 2550 has been drawn abstractly to illustrate the communication between host computer 2510 and UE 2530 via base station 2520, without explicit reference to any intermediary devices and the precise routing of messages via these devices. Network infrastructure may determine the routing, which it may be configured to hide from UE 2530 or from the service provider operating host computer 2510, or both. While OTT connection 2550 is active, the network infrastructure may further take decisions by which it dynamically changes the routing (e.g., on the basis of load balancing consideration or reconfiguration of the network).

Wireless connection 2570 between UE 2530 and base station 2520 is in accordance with the teachings of the embodiments described throughout this disclosure. One or more of the various embodiments improve the performance of OTT services provided to UE 2530 using OTT connection 2550, in which wireless connection 2570 forms the last segment. More precisely, the teachings of these embodiments may improve service continuity and/or reliability of handover, and thereby provide benefits such as fewer radio link failures and/or fewer service interruptions, among other things.

A measurement procedure may be provided for the purpose of monitoring data rate, latency and other factors on which the one or more embodiments improve. There may further be an optional network functionality for reconfiguring OTT connection 2550 between host computer 2510 and UE 2530, in response to variations in the measurement results. The measurement procedure and/or the network functionality for reconfiguring OTT connection 2550 may be implemented in software 2511 and hardware 2515 of host computer 2510 or in software 2531 and hardware 2535 of UE 2530, or both. In embodiments, sensors (not shown) may be deployed in or in association with communication devices through which OTT connection 2550 passes; the sensors may participate in the measurement procedure by supplying values of the monitored quantities exemplified above, or supplying values of other physical quantities from which software 2511, 2531 may compute or estimate the monitored quantities. The reconfiguring of OTT connection 2550 may include message format, retransmission settings, preferred routing etc.; the reconfiguring need not affect base station 2520, and it may be unknown or imperceptible to base station 2520, Such procedures and functionalities may be known and practiced in the art. In certain embodiments, measurements may involve proprietary UE signaling facilitating host computer 2510's measurements of throughput, propagation times, latency and the like. The measurements may be implemented in that software 2511 and 2531 causes messages to be transmitted, in particular empty or 'dummy' messages, using OTT connection 2550 while it monitors propagation times, errors etc.

Figure 19:
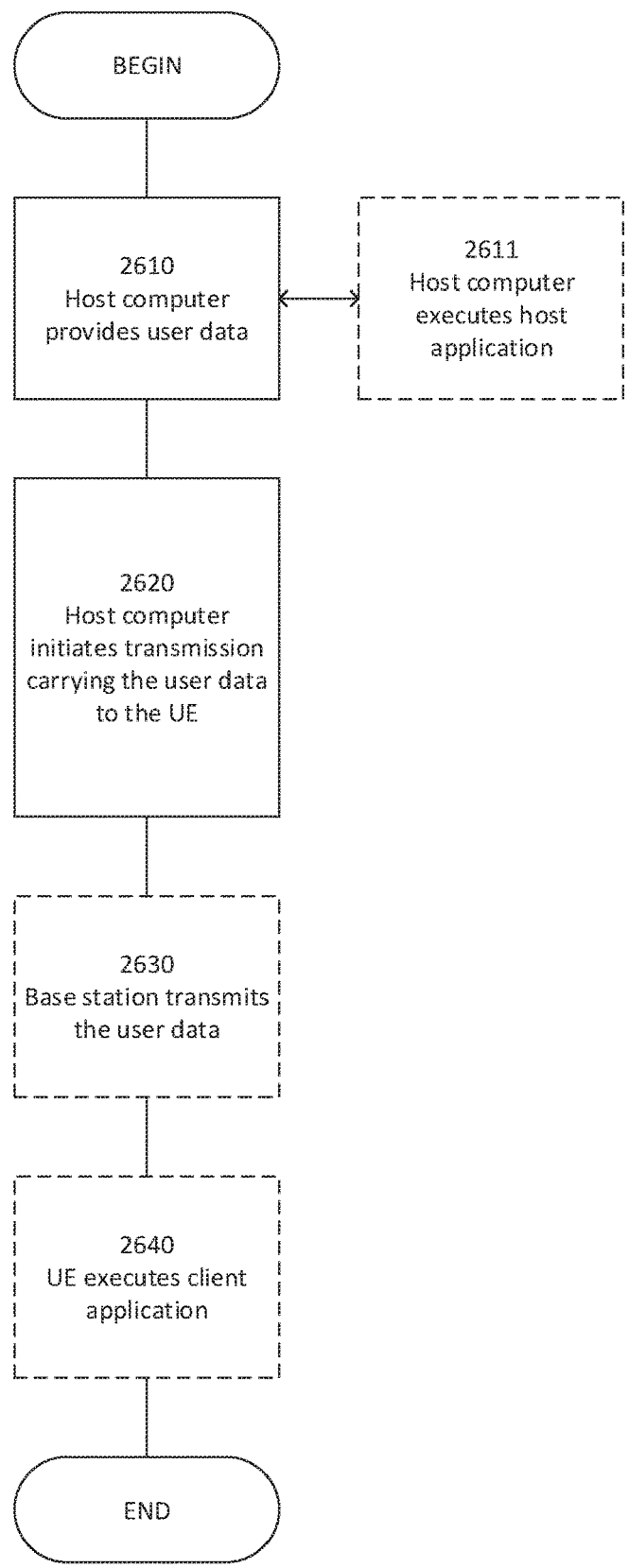
FIGS. 19-22 are flow diagrams, each of which illustrates an example method implemented in a communication system, according to particular embodiments of the present disclosure.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 2610, the host computer provides user data. In substep 2611 (which may be optional) of step 2610, the host computer provides the user data by executing a host application. In step 2620, the host computer initiates a transmission carrying the user data to the UE. In step 2630 (which may be optional), the base station transmits to the UE the user data which was carried in the transmission that the host computer initiated, in accordance with the teachings of the embodiments described throughout this disclosure. In step 2640 (which may also be optional), the UE executes a client application associated with the host application executed by the host computer.

Figure 20:
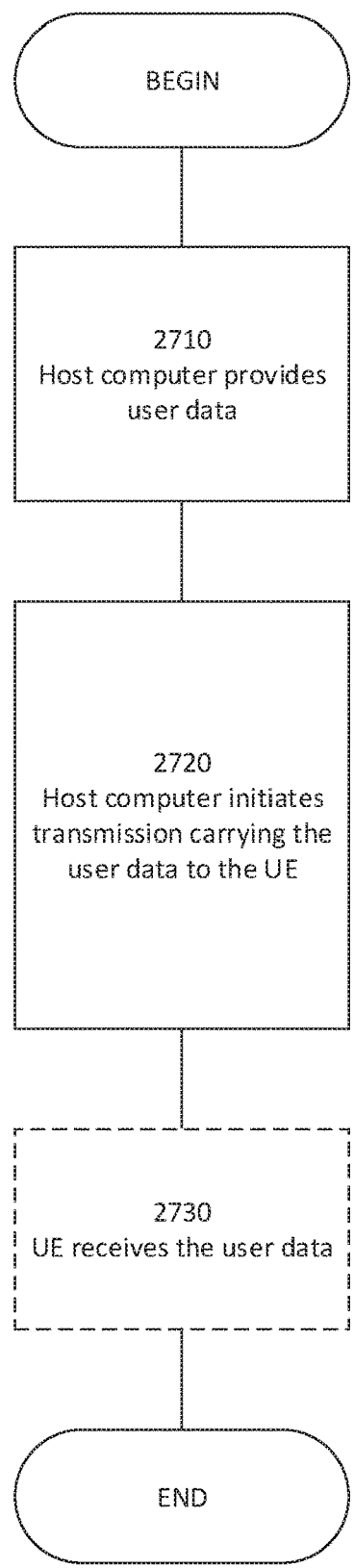
Figure 21:
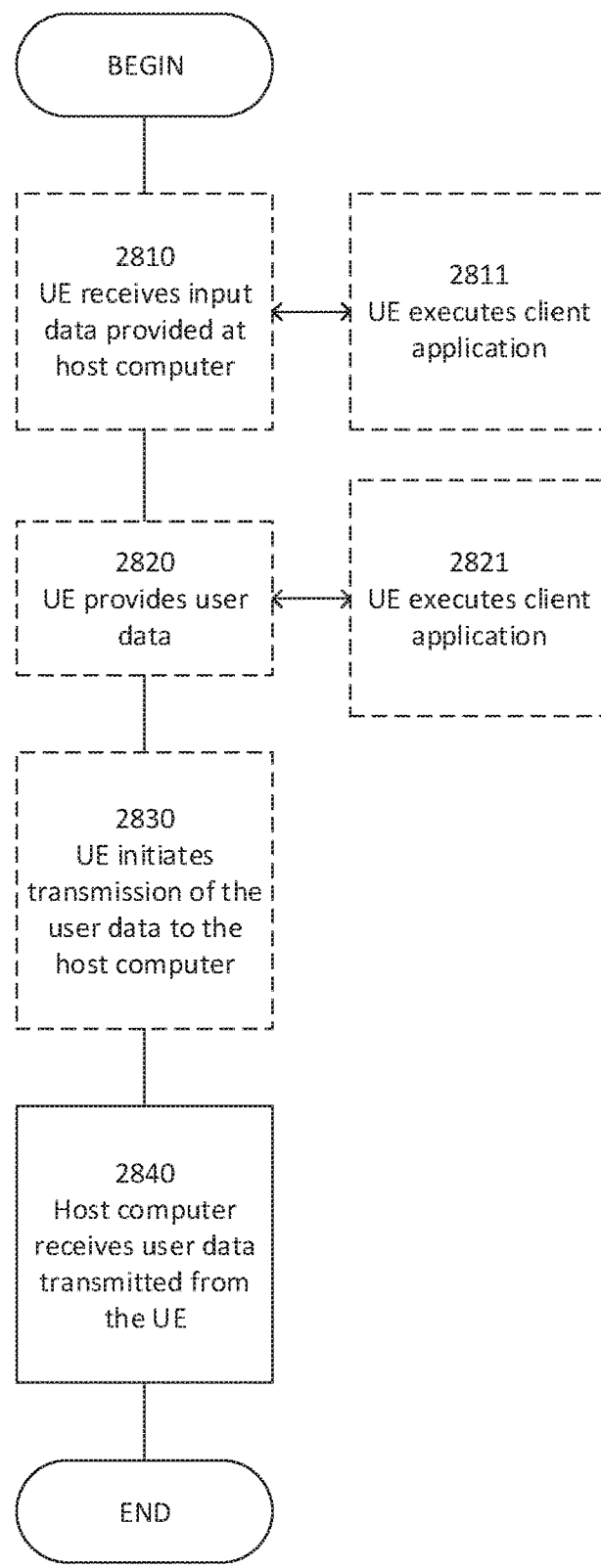

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2710 of the method, the host computer provides user data. In an optional substep (not shown) the host computer provides the user data by executing a host application. In step 2720, the host computer initiates a transmission carrying the user data to the UE, The transmission may pass via the base station, in accordance with the teachings of the embodiments described throughout this disclosure. In step 2730 (which may be optional), the UE receives the user data carried in the transmission, FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2810 (which may be optional), the UE receives input data provided by the host computer. Additionally or alternatively, in step 2820, the UE provides user data. In substep 2821 (which may be optional) of step 2820, the UE provides the user data by executing a client application. In substep 2811 (which may be optional) of step 2810, the UE executes a client application which provides the user data in reaction to the received input data provided by the host computer. In providing the user data, the executed client application may further consider user input received from the user. Regardless of the specific manner in which the user data was provided, the UE initiates, in substep 2830 (which may be optional), transmission of the user data to the host computer. In step 2840 of the method, the host computer receives the user data transmitted from the UE, in accordance with the teachings of the embodiments described throughout this disclosure.

Figure 22:
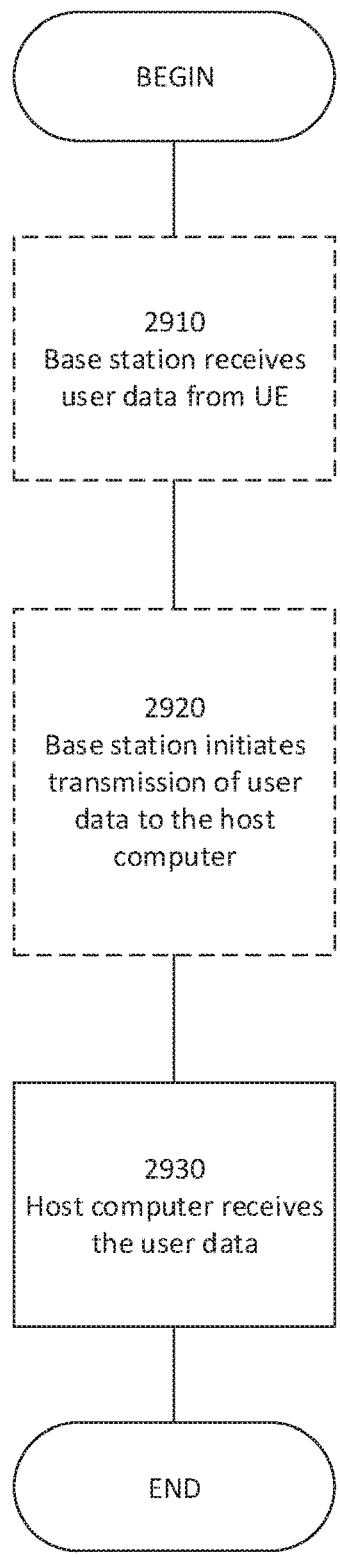

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2910 (which may be optional), in accordance with the teachings of the embodiments described throughout this disclosure, the base station receives user data from the UE. In step 2920 (which may be optional), the base station initiates transmission of the received user data to the host computer. In step 2930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method of obtaining a status of a wireless device, implemented by a base station, the method comprising:
   transmitting, to the wireless device, a criteria for determining that the wireless device has the status, wherein the criteria comprises a height threshold and the status is one of a plurality of predefined statuses that the base station is configured to recognize, the predefined statuses comprising a plurality of distinct aerial statuses, each of which indicates that the wireless device is airborne;
   receiving an indication of the status of the wireless device;
   configuring the wireless device based on the status; and
   responsive to the status being a loss of remote controller signal status or a low battery warning status, notifying an Unmanned Aerial Vehicle (UAV) Traffic Management (UTM) system of the status.

2. A wireless device comprising:
   a processor and a memory, the memory containing instructions executable by the processor whereby the wireless device is configured to:
   receive, from a wireless communication network, a criteria for determining that the wireless device has an aerial status, wherein the criteria comprises a height threshold;
   responsive to determining that the wireless device has lost a Global Positioning System (GPS) signal:
   transmit an indication of a loss of GPS signal status to a base station of the wireless communication network in a two-bit field capable of having four distinct states, each of the states corresponding to a respective one of a plurality of predefined statuses, wherein a first one of the states corresponds to the loss of GPS signal status and a second one of the states corresponds to the aerial status; and
   use received position reference signals to navigate.

3. A method of navigation, implemented in a wireless device, the method comprising:
   receiving, from a wireless communication network, a criteria for determining that the wireless device has an aerial status, wherein the criteria comprises a height threshold;
   responsive to determining that the wireless device has lost a Global Positioning System (GPS) signal:
   transmitting an indication of a loss of GPS signal status to a base station of the wireless communication network in a two-bit field capable of having four distinct states, each of the states corresponding to a respective one of a plurality of predefined statuses, wherein a first one of the states corresponds to the loss of GPS signal status and a second one of the states corresponds to the aerial status; and
   using received position reference signals to navigate.

4. The method of claim 3, wherein the plurality of predefined statuses comprises at least two aerial mobility statuses that indicate respective levels of mobility while the wireless device is airborne.

5. The method of claim 3, wherein a third one of the states corresponds to one of: a hovering status, a high speed flight status, a cruising flight status, a flight following a path status, a high altitude flight status, a takeoff status, a landing status, a remote controlled flight status, a vertical velocity change status, a warning status, an error status, a loss of remote controller signal status, or a low battery warning status.

6. The method of claim 3, further comprising responsive to transmitting the indication, receiving notification, from the base station, to:
   use a power control parameter;
   use a radio resource allocation parameter; and/or
   restrict handovers.

7. The method of claim 1, wherein receiving the indication comprises receiving the indication in a two-bit field having four distinct states, each of the states corresponding to a respective one of the predefined statuses.

8. The method of claim 1, wherein the plurality of distinct aerial statuses comprises at least two aerial mobility statuses that further indicate respective levels of mobility while the wireless device is airborne.

9. The method of claim 1, wherein the plurality of distinct aerial statuses comprises a hovering status, a high speed flight status, a cruising flight status, a flight following a path status, a high altitude flight status, a takeoff status, a landing status, a remote controlled flight status, a vertical velocity change status, a warning status, an error status, a loss of Global Positioning System (GPS) signal status, the loss of remote controller signal status, and/or the low battery warning status.

10. The method of claim 9, further comprising, responsive to the status being the loss of GPS signal status, configuring position reference signals for the wireless device to use for navigation.

11. The method of claim 1, further comprising:
   receiving, from the wireless device, a flight path that the wireless device is following;
   using the flight path to determine another base station along the flight path; and
   preparing to handover the wireless device to the other base station.

12. The method of claim 1, further comprising selecting an interference mitigation scheme for the wireless device based on the status.

13. The method of claim 1, wherein configuring the wireless device based on the status comprises notifying the wireless device, based on the status, to:
   use a power control parameter;
   use a radio resource allocation parameter; and/or
   restrict handovers.

14. The wireless device of claim 2, wherein a third one of the states corresponds to one of: a hovering status, a high speed flight status, a cruising flight status, a flight following a path status, a high altitude flight status, a takeoff status, a landing status, a remote controlled flight status, a vertical velocity change status, a warning status, an error status, a loss of remote controller signal status, or a low battery warning status.

15. The wireless device of claim 2, further configured to receive notification from the base station, responsive to transmitting the indication, to:
   use a power control parameter;

use a radio resource allocation parameter; and/or restrict handovers.

16. A base station for obtaining a status of a wireless device, the base station comprising:
  a processor and a memory, the memory containing instructions executable by the processor whereby the base station is configured to:
    transmit, to the wireless device, a criteria for determining that the wireless device has the status, wherein the criteria comprises a height threshold and the status is one of a plurality of predefined statuses that the base station is configured to recognize, the predefined statuses comprising a plurality of distinct aerial statuses, each of which indicates that the wireless device is airborne;
    receive an indication of the status of the wireless device;
    configure the wireless device based on the status; and
    responsive to the status being a loss of remote controller signal status or a low battery warning status, notify an Unmanned Aerial Vehicle (UAV) Traffic Management (UTM) system of the status.

17. The base station of claim 16, wherein to receive the indication, the base station is configured to receive the indication in a two-bit field having four distinct states, each of the states corresponding to a respective one of the predefined statuses.

18. The base station of claim 16, wherein the plurality of distinct aerial statuses comprises at least two aerial mobility statuses that further indicate respective levels of mobility while the wireless device is airborne.

19. The base station of claim 16, wherein the plurality of distinct aerial statuses comprises a hovering status, a high speed flight status, a cruising flight status, a flight following a path status, a high altitude flight status, a takeoff status, a landing status, a remote controlled flight status, a vertical velocity change status, a warning status, an error status, a loss of Global Positioning System (GPS) signal status, the loss of remote controller signal status, and/or the low battery warning status.

20. The base station of claim 16, further configured to:
  receive, from the wireless device, a flight path that the wireless device is following;
  use the flight path to determine another base station along the flight path; and
  prepare to handover the wireless device to the other base station.

21. The base station of claim 16, wherein the base station is further configured to select an interference mitigation scheme for the wireless device based on the status.

22. The base station of claim 16, wherein to configure the wireless device based on the status, the base station is configured to notify the wireless device, based on the status, to:
  use a power control parameter;
  use a radio resource allocation parameter; and/or
  restrict handovers.

* * * * *